US011915668B2

(12) United States Patent
Choi et al.

(10) Patent No.: US 11,915,668 B2
(45) Date of Patent: Feb. 27, 2024

(54) DISPLAY DEVICE HAVING UNIFORM LUMINANCE, AND DRIVING METHOD THEREOF

(71) Applicant: SAMSUNG DISPLAY CO., LTD., Yongin-si (KR)

(72) Inventors: Eun Jin Choi, Yongin-si (KR); Ki Hyun Pyun, Yongin-si (KR); Sung In Kang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/739,619

(22) Filed: May 9, 2022

(65) Prior Publication Data

US 2022/0262327 A1 Aug. 18, 2022

Related U.S. Application Data

(63) Continuation of application No. 17/016,988, filed on Sep. 10, 2020, now Pat. No. 11,341,932.

(30) Foreign Application Priority Data

Dec. 27, 2019 (KR) ........................ 10-2019-0176611

(51) Int. Cl.
*G09G 5/10* (2006.01)
*G09G 3/20* (2006.01)

(52) U.S. Cl.
CPC ............. *G09G 5/10* (2013.01); *G09G 3/2007* (2013.01); *G09G 2310/027* (2013.01);
(Continued)

(58) Field of Classification Search
None
See application file for complete search history.

(56) References Cited

U.S. PATENT DOCUMENTS 7,573,447 B2 8/2009 Oh et al.
7,609,248 B2 10/2009 Hong et al.
(Continued)

FOREIGN PATENT DOCUMENTS

EP 1591990 2/2005
EP 2113904 11/2009
(Continued)

OTHER PUBLICATIONS

Office Action dated Oct. 23, 2021 in related U.S. Appl. No. 17/079,281.

(Continued)

*Primary Examiner* — Amr A Awad
*Assistant Examiner* — Donna V Bocar
(74) *Attorney, Agent, or Firm* — F. Chau & Associates, LLC

(57) ABSTRACT

A display device includes a display panel including a plurality of pixels, a display panel driver, and a zone compensating circuit which divides the display panel into a plurality of unit blocks, obtains load values of input image data for the unit blocks, and generates corrected image data by correcting the input image data based on the load values. Each of the load values corresponds to one of the unit blocks. The display panel driver generates a data signal for displaying an image on the display panel based on the corrected image data. When grayscale values included in the input image data are the same, a luminance of the image displayed on the display panel is decreased moving away from a center of a reference block having a largest load value among the unit blocks based on the corrected image data.

14 Claims, 17 Drawing Sheets

(52) U.S. Cl.
CPC . *G09G 2310/0267* (2013.01); *G09G 2310/08* (2013.01); *G09G 2320/0686* (2013.01); *G09G 2330/023* (2013.01)

(56) References Cited

U.S. PATENT DOCUMENTS

| | | | | |
|---|---|---|---|---|
| 9,691,353 | B2 | 6/2017 | Joo et al. | |
| 11,361,731 | B2 | 6/2022 | Choi et al. | |
| 2008/0042938 | A1 | 2/2008 | Cok | |
| 2008/0174544 | A1* | 7/2008 | Ueda | G09G 3/3426 315/324 |
| 2008/0204475 | A1 | 8/2008 | Kim et al. | |
| 2009/0028460 | A1* | 1/2009 | Jung | G09G 3/3426 382/274 |
| 2011/0141090 | A1* | 6/2011 | Hong | G09G 3/3426 345/102 |
| 2015/0255019 | A1 | 9/2015 | Park et al. | |
| 2016/0217731 | A1 | 7/2016 | Joo et al. | |
| 2017/0032744 | A1* | 2/2017 | Yoo | G09G 3/2007 |
| 2018/0053462 | A1 | 2/2018 | Bae et al. | |
| 2018/0246375 | A1* | 8/2018 | Zhang | G02F 1/133602 |
| 2021/0201849 | A1 | 7/2021 | Choi et al. | |

FOREIGN PATENT DOCUMENTS

| | | |
|---|---|---|
| EP | 2375400 | 10/2011 |
| EP | 3792906 | 3/2021 |
| EP | 3843069 | 6/2021 |
| EP | 3886082 | 9/2021 |
| KR | 10-1096720 | 12/2011 |
| KR | 10-1097584 | 12/2011 |
| KR | 1020160071886 | 6/2016 |
| KR | 1020160092537 | 8/2016 |
| KR | 1020160095673 | 8/2016 |
| KR | 1020170132368 | 12/2017 |
| WO | 2019214246 | 11/2019 |

OTHER PUBLICATIONS

Office Action dated Aug. 3, 2021 in corresponding U.S. Appl. No. 17/016,988.

Office Action dated Oct. 26, 2022 in related U.S. Appl. No. 17/745,160 filed on May 16, 2022, which is a continuation application of the cross-referenced U.S. Appl. No. 17/079,281.

* cited by examiner

DISPLAY DEVICE HAVING UNIFORM LUMINANCE, AND DRIVING METHOD THEREOF

CROSS-REFERENCE TO RELATED APPLICATIONS

This application is a continuation application of U.S. patent application Ser. No. 17/016,988 filed Sep. 10, 2020, which claims priority under 35 U.S.C. § 119 to Korean Patent Application No. 10-2019-0176611, filed in the Korean Intellectual Property Office on Dec. 27, 2019, the disclosures of which are incorporated by reference herein in their entirety.

TECHNICAL FIELD

The present invention relates to a display device and a driving method thereof.

DISCUSSION OF THE RELATED ART

A display device may include a display panel and a display panel driver. The display panel driver may receive a control signal and input image data from an external source (e.g. graphic processors, etc.) and generate a data signal. The display panel may display an image in a display area based on the data signal. The display panel driver may control luminance of a periphery lower than that of a center of the display area, thereby decreasing power consumption of the display device.

However, a user's eyes may be focused on an area in which a load value of the input image data is large or a variation value of input image data between frames (e.g., a variation value of a load value of input image data between frames) is large in the display area. In this case, when the area in which the load value of the input image data or the variation value of the input image data between the frames is large in the display area corresponds to a periphery of the display area, as the display device is driven by decreasing the luminance of the periphery of the display area, the luminance of the area on which the user's eyes are focused may be decreased, thereby deteriorating visibility.

SUMMARY

An exemplary embodiment of the present invention provides a display device that prevents visibility of a user from being deteriorated by performing zonal attenuation compensation for decreasing power consumption and simultaneously not decreasing luminance corresponding to an area where the user's eyes are focused.

According to an exemplary embodiment, a display device includes a display panel including a plurality of pixels, a display panel driver, and a zone compensating circuit which divides the display panel into a plurality of unit blocks, obtains load values of input image data for the unit blocks, and generates corrected image data by correcting the input image data based on the load values. Each of the load values corresponds to one of the unit blocks. The display panel driver generates a data signal for displaying an image on the display panel based on the corrected image data. When grayscale values included in the input image data are the same, a luminance of the image displayed on the display panel is decreased moving away from a center of a reference block having a largest load value among the unit blocks based on the corrected image data.

In an exemplary embodiment, the zone compensating circuit generates the corrected image data by applying a luminance gain curve to the input image data, the luminance gain curve includes luminance gain values corresponding to a distance from the center of the reference block, and the zone compensating circuit decreases the luminance gain values of the luminance gain curve as the distance from the center of the reference block increases.

In an exemplary embodiment, as the load value obtained corresponding to the reference block decreases, the zone compensating circuit increases a degree of a decrease in the luminance gain values of the luminance gain curve moving away from the center of the reference block.

In an exemplary embodiment, as a sum of the load values obtained for the unit blocks decreases, the zone compensating circuit increases a degree of a decrease in the luminance gain values of the luminance gain curve moving away from the center of the reference block.

In an exemplary embodiment, when the distance from the center of the reference block is the same, the luminance gain values of the luminance gain curve are the same.

In an exemplary embodiment, the luminance gain curve is nonlinearly decreased, and a decrease rate of the luminance gain curve is increased as the distance from the center of the reference block increases.

In an exemplary embodiment, the luminance gain curve is linearly decreased.

In an exemplary embodiment, a decrease rate of the luminance gain curve has a different value depending on a direction away from the center of the reference block.

In an exemplary embodiment, the zone compensating circuit includes an image analyzing unit which obtains the load values of the input image data for the unit blocks, a luminance gain generating unit which generates the luminance gain curve based on the load values obtained for the unit blocks, and a data compensator which generates the corrected image data by applying the luminance gain curve to the input image data.

In an exemplary embodiment, the image analyzing unit obtains the load values based on grayscale values of the input image data corresponding to the unit blocks included in the display panel.

In an exemplary embodiment, the image analyzing unit obtains the load values based on on-pixel ratios corresponding to the unit blocks included in the display panel.

In an exemplary embodiment, the image analyzing unit obtains the load values every predetermined frame period.

In an exemplary embodiment, the luminance gain generating unit includes a comparator which compares the load values obtained for the unit blocks and generates a control signal based on a comparison result of the load values, and a controller which generates the luminance gain curve including the luminance gain values corresponding to the distance from the center of the reference block based on the control signal.

In an exemplary embodiment, the zone compensating circuit generates the corrected image data by applying a predetermined look-up table to the input image data, and the look-up table includes luminance gain values corresponding to a distance from the center of the reference block.

According to an exemplary embodiment, a display device includes a display panel including a plurality of pixels, a display panel driver, and a zone compensating circuit which divides the display panel into a plurality of unit blocks, obtains data variation values of input image data for the unit blocks, and generates corrected image data by correcting the input image data based on the data variation values. Each of the data variation values corresponds to one of the unit blocks. The display panel driver generates a data signal for displaying an image on the display panel based on the corrected image data. When grayscale values included in the input image data are the same, a luminance of the image displayed on the display panel is decreased moving away from a center of a reference block having a largest data variation value among the unit blocks based on the corrected image data.

In an exemplary embodiment, the zone compensating circuit obtains the data variation values of the input image data by comparing load values of the input image data corresponding to a current frame with load values of the input image data corresponding to a previous frame for each unit block.

According to an exemplary embodiment, a driving method of a display device including a display panel including a plurality of pixels includes dividing the display panel into a plurality of unit blocks, and obtaining load values of input image data for the unit blocks. Each of the load values corresponds to one of the unit blocks. The driving method further includes extracting a reference block with a largest load value among the unit blocks, generating corrected image data by correcting the input image data based on the reference block and the load values, and displaying an image on the display panel based on the corrected image data. When grayscale values included in the input image data are the same, a luminance of the image displayed on the display panel is decreased moving away from a center of the reference block based on the corrected image data.

In an exemplary embodiment, generating the corrected image data includes generating a luminance gain curve based on the reference block and the load values obtained for the unit blocks, and generating the corrected image data by applying the luminance gain curve to the input image data. The luminance gain curve includes luminance gain values corresponding to a distance from the center of the reference block.

In an exemplary embodiment, the luminance gain values of the luminance gain curve are decreased as the distance from the center of the reference block increases.

In an exemplary embodiment, as the load value obtained corresponding to the reference block decreases, a degree of a decrease in the luminance gain values of the luminance gain curve is increased moving away from the center of the reference block.

In an exemplary embodiment, as a sum of the load values obtained for the unit blocks decreases, a degree of a decrease in the luminance gain values of the luminance gain curve is increased moving away from the center of the reference block.

In an exemplary embodiment, when the distance from the center of the reference block is the same, the luminance gain values of the luminance gain curve are the same.

In an exemplary embodiment, a decrease rate of the luminance gain curve has a different value depending on a direction away from the center of the reference block.

In an exemplary embodiment, the corrected image data is generated by applying a predetermined look-up table to the input image data. The look-up table includes luminance gain values corresponding to a distance from the center of the reference block.

According to an exemplary embodiment, a driving method of a display device including a display panel including a plurality of pixels includes dividing the display panel into a plurality of unit blocks, and obtaining data variation values of input image data for the unit blocks. Each of the data variation values corresponds to one of the unit blocks. The driving method further includes extracting a reference block with a largest data variation value among the unit blocks, generating corrected image data by correcting the input image data based on the reference block and the data variation values, and displaying an image on the display panel based on the corrected image data. When grayscale values included in the input image data are the same, a luminance of the image displayed on the display panel is decreased moving away from a center of the reference block based on the corrected image data.

In an exemplary embodiment, obtaining the data variation values of the input image data includes obtaining load values of the input image data corresponding to a previous frame for each unit block, obtaining load values of the input image data corresponding to a current frame for each unit block, and obtaining the data variation values of the input image data by comparing the load values corresponding to the current frame and the load values corresponding to the previous frame for each unit block.

A display device according to exemplary embodiments of the present invention may extract the reference block having the largest load value and/or data variation value among the unit blocks, and may perform zonal attenuation compensation for correcting the input image data so that the luminance of the image displayed on the display panel may be decreased moving away from the center of the reference block using the zonal compensator. Accordingly, the display device can prevent deterioration of visibility of the user by performing zonal attenuation compensation for decreasing power consumption and simultaneously not decreasing luminance corresponding to an area where the user's eyes are focused, such as the reference block.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
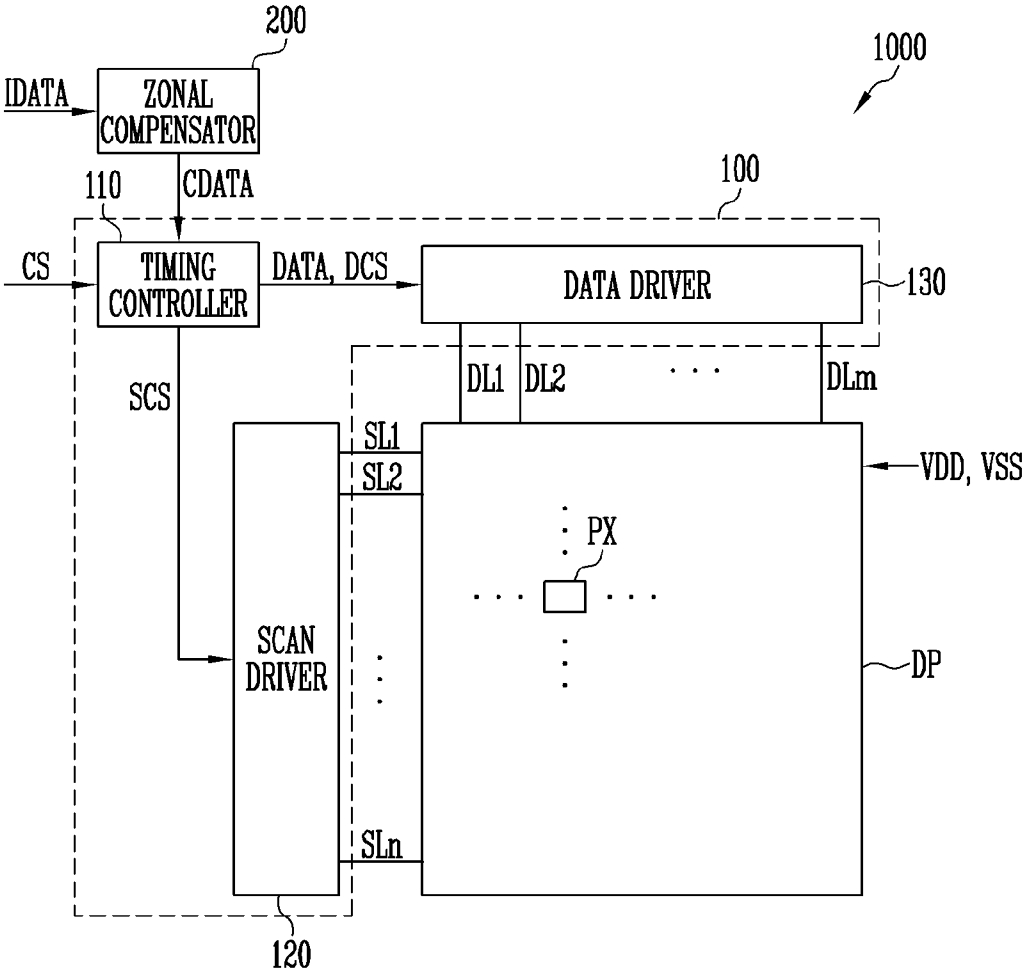
FIG. 1 illustrates a display device according to an exemplary embodiment of the present invention.

Exemplary embodiments of the present invention will be described more fully hereinafter with reference to the accompanying drawings. Like reference numerals may refer to like elements throughout the accompanying drawings.

The terms, 'first', 'second', etc. may be used simply for description of various constituent elements, but those meanings may not be limited to the restricted meanings. For example, the above terms may be used only for distinguishing one constituent element from other constituent elements. For example, a first constituent element may be referred to as a second constituent element, and similarly, the second constituent element may be referred to as the first constituent element. When explaining the singular, unless explicitly described to the contrary, it may be interpreted as the plural meaning.

In the specification, the word "comprise" or "has" is used to specify existence of a feature, a numbers, a process, an operation, a constituent element, a part, or a combination thereof, and it will be understood that the existence or additional possibility of one or more other features or numbers, processes, operations, constituent elements, parts, or combinations thereof are not excluded.

Figure 2:
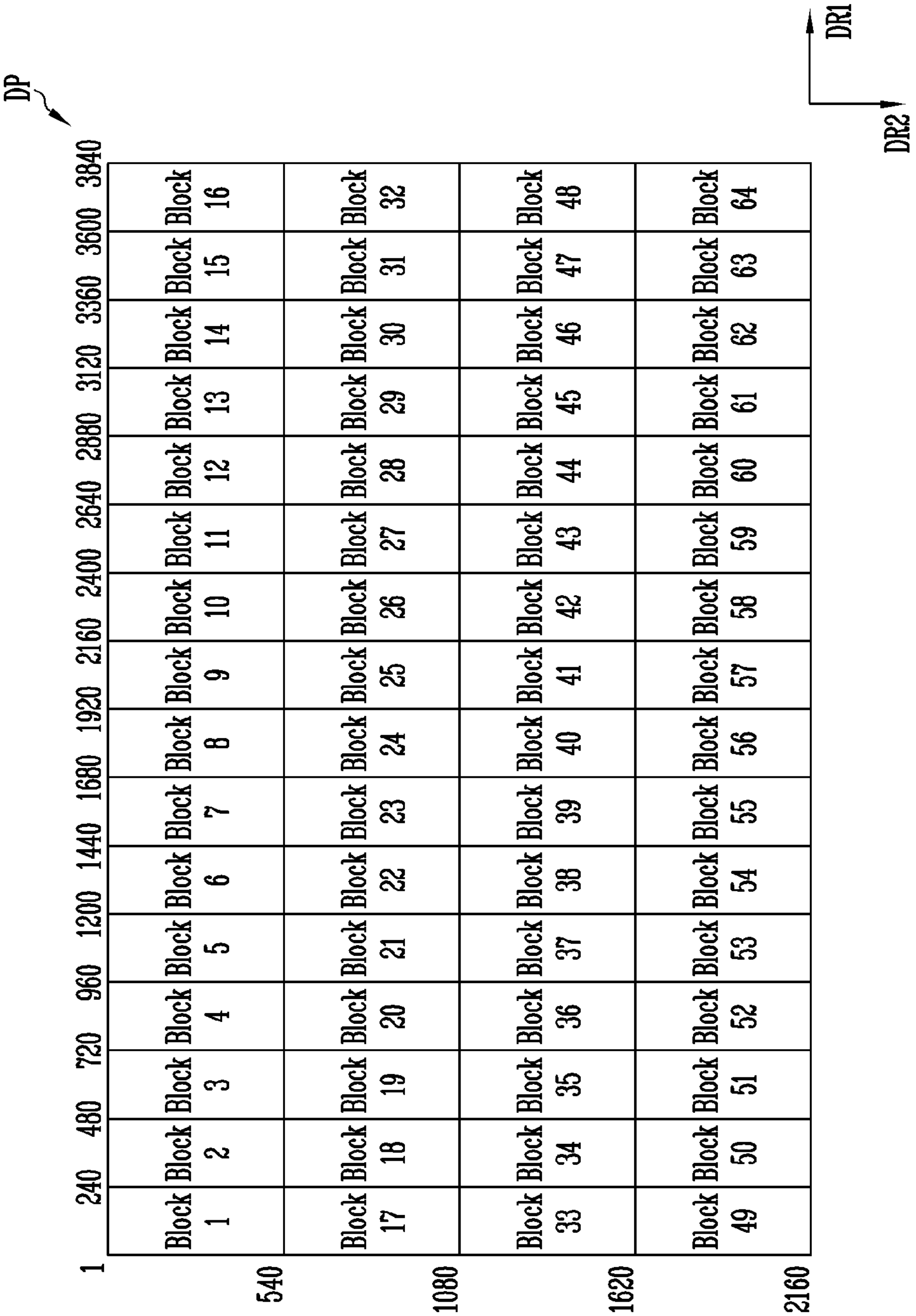
FIG. 2 illustrates a display panel included in the display device shown in FIG. 1 according to an exemplary embodiment of the present invention.

FIG. 1 illustrates a display device according to an exemplary embodiment of the present invention. FIG. 2 illustrates a display panel included in the display device shown in FIG. 1 according to an exemplary embodiment of the present invention.

Referring to FIGS. 1 and 2, a display device 1000 may include a display panel DP, a display panel driver 100, and a zonal compensator 200. In exemplary embodiments, each of the display panel driver 100 and the zonal compensator 200 may be implemented as a circuit. Thus, the display panel driver 100 may also be referred to herein as a display panel driver circuit, and the zonal compensator 200 may also be referred to herein as a zone compensating circuit.

The display panel DP may include a plurality of scan lines SL1 to SLn in which n is a natural number, a plurality of data lines DL1 to DLm in which m is a natural number, and a plurality of pixels PX.

The pixels PX may be connected to at least one of the scan lines SL1 to SLn and at least one of the data lines DL1 to DLm. The pixels PX may receive voltages of a first power supply VDD and a second power supply VSS from an external source. Herein, an external source may refer to a source disposed outside of the display device 1000. The first power supply VDD and the second power supply VSS are voltages used for an operation of the pixels PX, and the first power supply VDD may have a higher voltage level than a voltage level of the second power supply VSS.

The display panel DP may include a plurality of unit blocks Block1 to Block64 (see FIG. 2), and may display an image based on corrected image data CDATA.

The display panel driver 100 may generate a data signal DATA for displaying an image on the display panel DP based on the corrected image data CDATA.

In an exemplary embodiment, the display panel driver 100 may include a timing controller 110, a scan driver 120 and a data driver 130. In exemplary embodiments, each of the timing controller 110, the scan driver 120 and the data driver 130 may be implemented as a circuit. Thus, the timing controller 110 may also be referred to herein as a timing controller circuit, the scan driver 120 may also be referred to herein as a scan driver circuit, and the data driver 130 may also be referred to herein as a data driver circuit.

The timing controller 110 may receive a control signal CS from an external source (e.g., a graphic processor) and receive the corrected image data CDATA from the zonal compensator 200. The timing controller 110 may generate a scan control signal SCS and a data control signal DCS based on the control signal CS, and convert the corrected image data CDATA to generate the data signal DATA. The control signal CS may include, for example, a vertical synchronization signal, a horizontal synchronization signal, a clock signal, etc.

The scan driver 120 may generate scan signals based on the scan control signal SCS provided from the timing controller 110. The scan control signal SCS may include, for example, a scan start signal, a scan clock signal, etc. The scan driver 120 may provide the scan signals to the scan lines SL1 to SLn sequentially. For example, the scan driver 120 may provide scan signals with pulses of turn-on levels sequentially on the scan lines SL1 to SLn. For example, the scan driver 120 may generate the scan signals by delivering pulses of turn-on-levels sequentially to a next scan stage in response to a clock signal. For example, the scan driver 120 may be configured in the form of a shift register.

The data driver 130 may generate data voltages based on the data signal DATA and the data control signal DCS provided from the timing controller 110, and provide the data voltages to the data lines DL1 to DLm. The data driver 130 may generate analog data voltages based on digital data signals DATA. For example, the data driver 130 may sample grayscale values included in the data signal DATA and provide data voltages corresponding to the grayscale values to the data lines DL1 to DLm in pixel row units. The data control signal DCS may include, for example, a data clock signal, a data enable signal, etc.

The zonal compensator 200 may receive input image data IDATA from an external source, and obtain a load value of the input image data IDATA and/or a data variation value of the input image data IDATA. The load value may represent a driving amount of the input image data with respect to a maximum driving amount, and the data variation value may represent a difference between the input image data IDATA corresponding to a current frame and the input image data IDATA corresponding to a previous frame.

In an exemplary embodiment, the zonal compensator 200 may divide the display panel DP into a plurality of unit blocks Block1 to Block64, and obtain the load values of the input image data IDATA and/or the data variation values of the input image data IDATA for each unit block.

For example, as shown in FIG. 2, the zonal compensator 200 may divide the display panel DP into sixteen blocks in a first direction DR1 and into four blocks in a second direction DR2 crossing the first direction DR1, to divide the display panel DP into a total of 64 unit blocks, that is, into the first to sixty-fourth unit blocks Block1 to Block64. The same number of scan lines, the same number of data lines and the same number of pixels PX may be disposed in the first to sixty-fourth unit blocks Block1 to Block64, respectively, and the first to sixty-fourth unit blocks Block1 to Block64 may have the same size. For example, when a resolution of the display device 1000 is Ultra High Definition (UHD) that provides a resolution of 3840×2160 (4K), 540 scan lines, 240 data lines and 129,600 pixels PX may be disposed in each of the first to sixty-fourth unit blocks Block1 to Block64. However, the number of unit blocks Block1 to Block64 is not limited thereto. For example, in an exemplary embodiment, the zonal compensator 200 may divide the display panel DP into sixteen blocks in the first direction DR1 and eight blocks in the second direction DR2 to divide the display panel DP into a total of 128 unit blocks.

The numbers (e.g., 1, 240, 480, . . . , 3840 or 1, 540, . . . , 2160) shown in FIG. 2 may indicate relative spatial positions of the pixels PXs included in the display panel DP. For example, the number 1 may refer to the first pixel PX among the pixels PX disposed in the first direction DR1 or the first pixel PX among the pixels PX disposed in the second direction DR2, the number 3840 may refer to the 3840-th pixel PX among the pixels PX disposed in the first direction DR1, and the number 2160 may refer to the 2160-th pixel PX among the pixels PX disposed in the second direction DR2. As such, the numbers (1, 240, 480, . . . , 3840 or 1, 540, . . . , 2160) shown in FIG. 2 may refer to a relative spatial position (or relative distance or length) of the pixels PX.

A configuration in which the zonal compensator 200 obtains the load values of the input image data IDATA the data variation values of the input image data IDATA for each unit block of the display panel DP will be described later with reference to FIGS. 3 and 4.

The zonal compensator 200 may correct the input image data IDATA based on the load values of the input image data IDATA obtained for each unit block and/or the data variation values of the input image data IDATA obtained for each unit block to generate corrected image data CDATA, and may provide the corrected image data CDATA to the timing controller 110.

The zonal compensator 200 may correct the input image data IDATA to generate the corrected image data CDATA so that the image displayed on the display panel DP may have different luminance according to the spatial position of the pixels PX based on the load values of the input image data IDATA obtained for each unit block and/or the data variation values of the input image data IDATA obtained for each unit block.

In an exemplary embodiment, the zonal compensator 200 may extract a unit block (also referred to as a reference block) having the largest load value of the input image data IDATA and/or the largest data variation value of the input image data IDATA obtained among the unit blocks Block1 to Block64. In addition, when grayscale values included in the input image data IDATA are the same (or when the display device 1000 implements the pixels PX included in the display panel DP with the same grayscale values), the zonal compensator 200 may generate corrected image data CDATA by correcting the input image data IDATA so that the luminance of the image displayed on the display panel DP may be gradually decreased moving away from the center of the reference block.

In an exemplary embodiment, when the grayscale values included in the input image data IDATA are the same, a luminance distribution of the image displayed based on the corrected image data CDATA may be a Gaussian distribution in which the luminance is gradually decreased moving away from the center of the reference block.

The zonal compensator 200 may generate the corrected image data CDATA by correcting the input image data IDATA by applying luminance gain values corresponding to each of the spatial positions to the input image data IDATA according to the spatial position of the pixels PX.

In an exemplary embodiment, the zonal compensator 200 may generate the corrected image data CDATA by correcting the input image data IDATA by applying a luminance gain curve Z_GAIN (see FIG. 3) to the input image data IDATA.

In an exemplary embodiment, the luminance gain curve Z_GAIN (see FIG. 3) may include luminance gain values corresponding to the spatial position of the pixels PX included in the display panel DP. For example, the luminance gain curve Z_GAIN (see FIG. 3) may include the luminance gain values corresponding to each pixel PX included in the display panel DP.

The luminance gain values may have a value between 0 and 1, and the luminance of the image displayed on the display panel DP may be controlled according to the luminance gain values. For example, the smaller the luminance gain value, the smaller the luminance of the image displayed on the display panel DP, and the larger the luminance gain value, the larger the luminance of the image displayed on the display panel DP. The luminance of an image displayed based on the corrected image data CDATA generated by applying a luminance gain value of 1 to the input image data IDATA may be the same as the luminance corresponding to the input image data IDATA, and the luminance of an image displayed based on the corrected image data CDATA generated by applying a luminance gain value greater than 0 and less than 1 to the input image data IDATA may be smaller than the luminance corresponding to the input image data IDATA. In addition, the luminance of an image displayed based on the corrected image data CDATA generated by applying a luminance gain value of 0 to the input image data IDATA may be the same as black luminance.

In an exemplary embodiment, the luminance gain curve Z_GAIN (see FIG. 3) may include luminance gain values corresponding to a distance from the center of the reference block.

The zonal compensator 200 may reduce the luminance gain value included in the luminance gain curve Z_GAIN (FIG. 3) as the distance from the center of the reference block increases. In an exemplary embodiment, the zonal compensator 200 may generate the luminance gain curve Z_GAIN by decreasing luminance gain values of a first sub-luminance gain curve X_Z_GAIN (see FIG. 6B) and a second sub-luminance gain curve Y_Z_GAIN (see FIG. 6D) as the distance from the center of the reference block increases and by obtaining the first and second sub-luminance gain curves X_Z_GAIN and Y_Z_GAIN (see FIGS. 6B and 6D). Accordingly, the luminance gain curve Z_GAIN (see FIG. 3) may include the luminance gain values having smaller values as the distance from the center of the reference block increases. Accordingly, when the grayscale values included in the input image data IDATA are the same, the luminance of an image displayed based on the corrected image data CDATA generated by applying the luminance gain curve Z_GAIN (see FIG. 3) to the input image data IDATA may be decreased moving away from the center of the reference block. A configuration in which the zonal compensator 200 generates the luminance gain curve Z_GAIN (see FIG. 3) will be described later with reference to FIGS. 3 to 7E.

However, the configuration in which the zonal compensator 200 generates the corrected image data CDATA is not limited thereto. For example, the zonal compensator 200 may generate the corrected image data CDATA by applying a predetermined lookup table (LUT) to the input image data IDATA. The lookup table may include luminance gain values corresponding to the distance from the center of the reference block. Accordingly, the zonal compensator 200 generates the corrected image data CDATA by applying the lookup table including the luminance gain values to the input image data IDATA, so that the luminance of the image displayed on the display panel DP based on the corrected image data CDATA may be decreased moving away from the center of the reference block when the grayscale values included in the input image data IDATA are the same.

In FIG. 1, the zonal compensator 200 is shown as a separate configuration from the timing controller 110, and the zonal compensator 200 is described as correcting the input image data IDATA provided from an external source to generate the corrected image data CDATA and providing the corrected image data CDATA to the timing controller 110. However, the present invention is not limited thereto. For example, in an exemplary embodiment, the zonal compensator 200 may be included in the timing controller 110, and the timing controller 110 including the zonal compensator 200 may generate the corrected image data CDATA by correcting the input image data IDATA provided from an external source.

As described with reference to FIGS. 1 and 2, the zonal compensator 200 may correct the input image data IDATA based on the load values of the input image data IDATA obtained for each unit block and/or the data variation values of the input image data IDATA obtained for each unit block to generate corrected image data CDATA, thereby performing zonal attenuation compensation that differentially controls luminance according to the spatial position of the pixels PX. This zonal attenuation compensation may reduce the power consumption of the display device 1000.

In addition, as described above, the zonal compensator 200 may extract a reference block having the largest load value of the input image data IDATA and/or the largest data variation value of the input image data IDATA obtained among the unit blocks Block1 to Block64, and, when the grayscale values included in the input image data IDATA are the same, may perform the zonal attenuation compensation for correcting the input image data IDATA so that the luminance of the image displayed on the display panel DP may be gradually decreased moving away from the center of the reference block. In this case, the image displayed based on the corrected image data CDATA may have the brightest luminance value in the area corresponding to the reference block among the display areas of the display panel DP, and may have a relatively dark luminance value in an area corresponding to a block disposed far from the reference block among the display area of the display panel DP. At this time, since the user's eyes may be focused on an area corresponding to a unit block in which the load value of the input image data IDATA and/or the data variation value of the input image data IDATA is large, that is, the reference block among the display area, even if the zonal attenuation compensation is performed to reduce power consumption, luminance corresponding to the area on which the user's eyes are focused is not decreased, and thus deterioration of visibility may be prevented.

Figure 3:
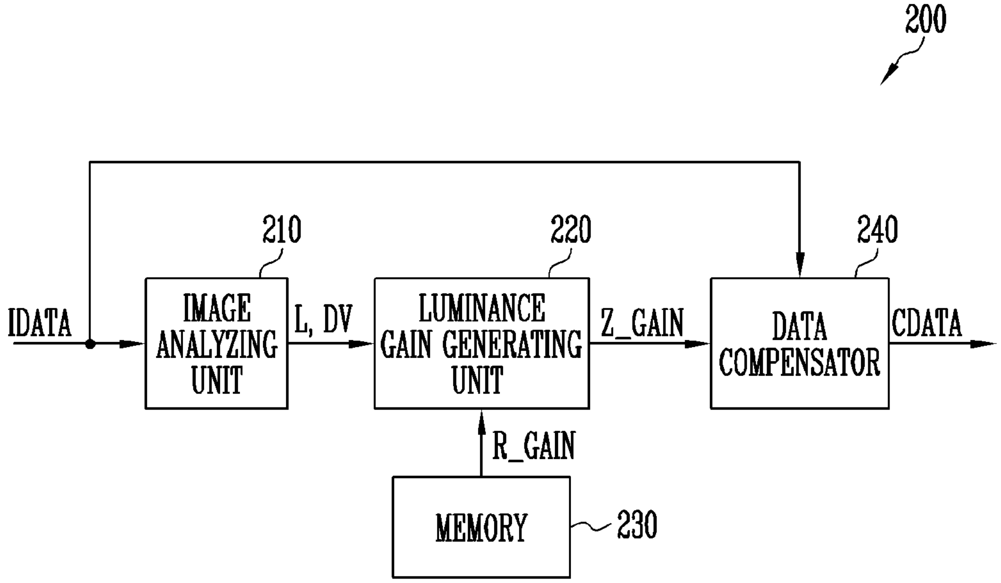
FIG. 3 illustrates a zonal compensator included in the display device shown in FIG. 1 according to an exemplary embodiment of the present invention.

FIG. 3 illustrates the zonal compensator 200 included in the display device 1000 shown in FIG. 1 according to an exemplary embodiment of the present invention.

Referring to FIG. 3, in an exemplary embodiment, the zonal compensator 200 may include an image analyzing unit 210, a luminance gain generating unit 220, a memory 230, and a data compensator 240. In exemplary embodiments, each of the image analyzing unit 210, the luminance gain generating unit 220, and the data compensator 240 may be implemented as a circuit. Thus, the image analyzing unit 210 may also be referred to as an image analyzing circuit, the luminance gain generating unit 220 may also be referred to as a luminance gain generating circuit, and the data compensator 240 may also be referred to as a data compensator circuit.

The image analyzing unit 210 may obtain load values L and/or data variation values DV of the input image data IDATA based on the input image data IDATA provided from an external source.

In an exemplary embodiment, the image analyzing unit 210 may obtain the load values L and/or data variation values DV of the input image data IDATA for each unit block, and may provide the obtained load values L and/or data variation values DV to the luminance gain generating unit 220.

Figure 4:
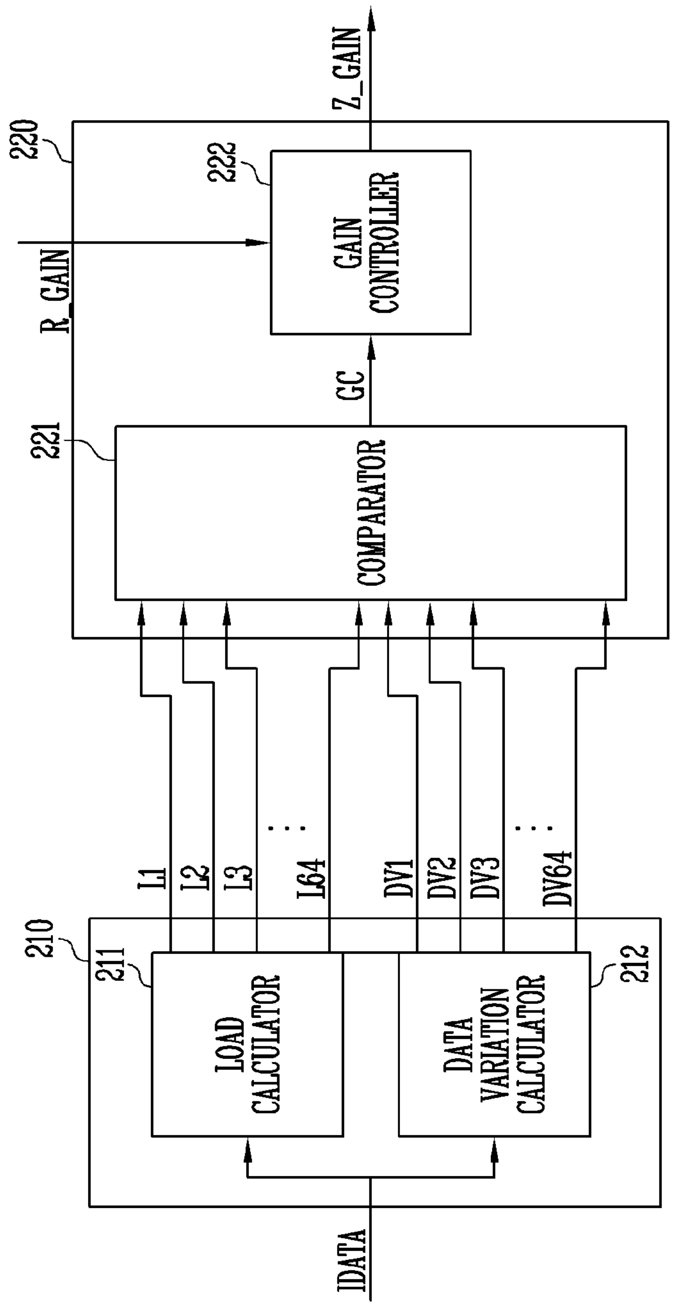
FIG. 4 illustrates an image analyzing unit and a luminance gain generating unit included in the zonal compensator shown in FIG. 3 according to an exemplary embodiment of the present invention.

In an exemplary embodiment, the image analyzing unit 210 may include a load calculator 211 (see FIG. 4) and a data variation calculator 212 (see FIG. 4). The load calculator 211 (see FIG. 4) and the data variation calculator 212 (see FIG. 4) will be described later with reference to FIG. 4.

The luminance gain generating unit 220 may generate the luminance gain curve Z_GAIN based on the load values L and/or the data variation values DV provided from the image analyzing unit 210 and reference luminance gain values R_GAIN provided from the memory 230.

In an exemplary embodiment, the luminance gain generating unit 220 may extract the reference block described with reference to FIG. 1 and generate the luminance gain curve Z_GAIN including luminance gain values corresponding to the distance from the center of the reference block. For example, the luminance gain generating unit 220 may generate the luminance gain curve Z_GAIN having a small luminance gain value as the distance from the center of the reference block increases.

In an exemplary embodiment, the luminance gain generating unit 220 may control a degree to which the luminance gain value of the luminance gain curve Z_GAIN is decreased moving away from the center of the reference block based on a magnitude of the obtained load values L of the input image data IDATA and/or data variation values DV of the input image data IDATA. For example, the luminance gain generating unit 220 may increase a degree to which the luminance gain value of the luminance gain curve Z_GAIN is decreased moving away from the center of the reference block as a sum of the obtained load values L of the input image data IDATA and/or a sum of the obtained data variation values DV of the input image data IDATA decreases. As another example, the luminance gain generating unit 220 may increase a degree to which the luminance gain value of the luminance gain curve Z_GAIN is decreased moving away from the center of the reference block as the load value L and/or data variation value DV, corresponding to the reference block among the obtained load values L of the input image data IDATA and/or data variation values DV of the input image data IDATA, is smaller.

In an exemplary embodiment, the luminance gain generating unit 220 may include a comparator 221 (see FIG. 4) and a luminance gain controller 222 (see FIG. 4). The comparator 221 (see FIG. 4) and the luminance gain controller 222 (see FIG. 4) will be described later with reference to FIGS. 4 and 5.

The memory 230 may store predetermined reference luminance gain values R_GAIN. The reference luminance gain values R_GAIN may include luminance gain values corresponding to the load values L and/or data variation values DV. The reference luminance gain values R_GAIN will be described later with reference to FIGS. 6A to 7E.

The data compensator 240 may correct the input image data IDATA based on the luminance gain curve Z_GAIN provided from the luminance gain generating unit 220. In an exemplary embodiment, the data compensator 240 may generate the corrected image data CDATA by correcting the input image data IDATA by applying the luminance gain curve Z_GAIN to the input image data IDATA. As described above with reference to FIGS. 1 and 2, when the grayscale values included in the input image data IDATA are the same, the luminance of an image displayed based on the corrected image data CDATA generated by applying the luminance gain curve Z_GAIN to the input image data IDATA may be decreased as the distance from the center of the reference block increases.

FIG. 4 illustrates the image analyzing unit 210 and the luminance gain generating unit 220 included in the zonal compensator 200 shown in FIG. 3 according to an exemplary embodiment of the present invention.

Referring to FIGS. 2 and 4, the load calculator 211 may obtain load values L1, L2, . . . , L64 based on the input image data IDATA corresponding to one frame (e.g., a current frame). The load values L1, L2, . . . , L64 may be substantially the same as the load values L described with reference to FIG. 3. In an exemplary embodiment, the load calculator 211 may be implemented as a circuit. Thus, the load calculator 211 may also be referred to herein as a load calculator circuit.

In an exemplary embodiment, the load calculator 211 may divide the display panel DP into a plurality of unit blocks Block1 to Block64, and may obtain the load values L1, L2, . . . , L64 of the input image data IDATA corresponding to the unit blocks Block1 to Block64, respectively.

In an exemplary embodiment, the load calculator 211 may obtain the load values L1, L2, . . . , L64 based on the grayscale values (e.g., the sum of grayscale values, the average of grayscale values, etc.) of the input image data IDATA respectively corresponding to the unit blocks Block1 to Block64 included in the display panel DP. For example, the load calculator 211 may obtain a first load value L1 corresponding to a first unit block Block1 from the grayscale values of the pixels PX disposed in the first unit block Block1 among the grayscale values of the pixels PX included in the input image data IDATA, and may obtain a second load value L2 corresponding to a second unit block Block2 from the grayscale values of pixels PX disposed in the second unit block Block2 among the grayscale values of pixels PX included in the input image data IDATA. Similarly, the load calculator 211 may obtain third to sixty-fourth load values L3, . . . , L64 corresponding to the third to sixty-fourth unit blocks Block3 to Block64, respectively.

In an exemplary embodiment, the load calculator 211 may obtain on-pixel ratios (OPR) respectively corresponding to the unit blocks Block1 to Block64 included in the display panel DP based on the input image data IDATA, and may obtain the load values L1, L2, . . . , L64 based on the obtained on-pixel ratios for each unit block. The load calculator 211 may obtain the on-pixel ratio of the corresponding unit block, based on a ratio of the pixels PX emitting light among the pixels PX disposed in the corresponding unit block, for each unit block based on the input image data IDATA. For example, the load calculator 211 may obtain the on-pixel ratio corresponding to the first unit block Block1 from a ratio of the pixels PX emitting light among the pixels PX disposed in the first unit block Block1 to obtain the first load value corresponding to the first unit block Block1, and may obtain the on-pixel ratio corresponding to the second unit block Block2 from a ratio of the pixels PX emitting light among the pixels PX disposed in the second unit block Block1 to obtain the second load value corresponding to the second unit block Block1, based on the input image data IDATA. Similarly, the load calculator 211 may obtain third to sixty-fourth load values L3, . . . , L64 corresponding to the third to sixty-fourth unit blocks Block3 to Block64, respectively.

The load calculator 211 may obtain the load values L1, L2, . . . , L64 every predetermined frame period. In an exemplary embodiment, the load calculator 211 may obtain the load values L1, L2, . . . , L64 every period of one frame. However, the period in which the load calculator 211 obtains the load values L1, L2, . . . , L64 is not limited thereto. For example, in an exemplary embodiment, the load calculator 211 may obtain the load values L1, L2, . . . , L64 every period of two frames or more.

The data variation calculator 212 may obtain data variation values DV1, DV2, . . . , DV64 based on the input image data IDATA. For example, the data variation calculator 212 may obtain the data variation values DV1, DV2, . . . , DV64 by comparing the input image data IDATA corresponding to the current frame and the input image data IDATA corresponding to the previous frame. However, the method of obtaining the data variation values DV1, DV2, . . . , DV64 by the data variation calculator 212 is not limited thereto. For example, in an exemplary embodiment, the data variation calculator 212 may obtain the data variation values DV1, DV2, . . . , DV64 by comparing the input image data IDATA corresponding to three or more frames including the current frame. The data variation values DV1, DV2, . . . , DV64 may be substantially the same as the data variation values DV described with reference to FIG. 3. In an exemplary embodiment, the data variation calculator 212 may be implemented as a circuit. Thus, the data variation calculator 212 may also be referred to herein as a data variation calculator circuit.

In an exemplary embodiment, the data variation calculator 212 may obtain the data variation values DV1, DV2, . . . , DV64 based on the load values of the input image data IDATA. For example, the data variation calculator 212 may obtain the data variation values DV1, DV2, . . . , DV64 by comparing the load values of the input image data IDATA corresponding to the current frame with the load values of the input image data IDATA corresponding to the previous frame. The load values may be substantially the same as the load values L1, L2, . . . , L64 (e.g., grayscale values or on-pixel ratios) obtained by the load calculator 211.

In an exemplary embodiment, the data variation calculator 212 may divide the display panel DP into unit blocks Block1 to Block64, and may obtain the data variation values of the input image data IDATA DV1, DV2, . . . , DV64 corresponding to the unit blocks Block1 to Block64, respectively.

In an exemplary embodiment, the data variation calculator 212 may obtain the data variation values DV1, DV2, . . . , DV64 respectively corresponding to the unit blocks (Block1 to Block64) by comparing the load values (e.g., grayscale values or on-pixel ratios) of the input image data IDATA corresponding to the current frame with the load values (e.g., grayscale values or on-pixel ratios) of the input image data IDATA corresponding to the previous frame by the unit blocks Block1 to Block64.

For example, the data variation calculator 212 may obtain a first data variation value DV1 by comparing the grayscale values of the pixels PX disposed in the first unit block Block1 among the grayscale values of the pixels PX included in the input image data IDATA between the current frame and the previous frame, and may obtain a second data variation value DV2 by comparing the grayscale values of the pixels PX disposed in the second unit block Block2 among the grayscale values of the pixels PX included in the input image data IDATA between the current frame and the previous frame. Similarly, the data variation calculator 212 may obtain the third to sixty-fourth data variation values DV3, . . . , DV64 corresponding to the third to sixty-fourth unit blocks Block3 to Block64, respectively.

As another example, the data variation calculator 212 may obtain the on-pixel ratio corresponding to the input image data IDATA corresponding to the current frame and the on-pixel ratio corresponding to the input image data IDATA corresponding to the previous frame with respect to the pixels PX disposed in the first unit block Block1, and may obtain the first data variation value DV1 by comparing the obtained on-pixel ratios. In addition, the data variation calculator 212 may obtain the on-pixel ratio corresponding to the input image data IDATA corresponding to the current frame and the on-pixel ratio corresponding to the input image data IDATA corresponding to the previous frame with respect to the pixels PX disposed in the second unit block Block2, and may obtain the second data variation value DV2 by comparing the obtained on-pixel ratios. Similarly, the data variation calculator 212 may obtain the third to sixty-fourth data variation values DV3, . . . , DV64 corresponding to the third to sixty-fourth unit blocks Block3 to Block64, respectively.

The data variation calculator 212 may obtain the data variation values DV1, DV2, . . . , DV64 every predetermined frame period. In an exemplary embodiment, the data variation calculator 212 may obtain data variation values (DV1, DV2, . . . , DV64) every period of one frame. However, the period in which the data variation calculator 212 obtains data variation values DV1, DV2, . . . , DV64 is not limited thereto. For example, in an exemplary embodiment, the data variation calculator 212 may obtain the data variation values DV1, DV2, . . . , DV64 every period of two frames or more.

The comparator 221 may compare the load values L1, L2, . . . , L64 and/or data variation values DV1, DV2, . . . , D64 respectively corresponding to the unit blocks Block1 to Block64 provided from the load calculator 211 and the data variation calculator 212, and may generate a luminance gain control signal GC based on a comparison result of the load values L1, L2, . . . , L64 and/or data variation values DV1, DV2, . . . , DV64. In an exemplary embodiment, the comparator 221 may be implemented as a circuit. Thus, the comparator 221 may also be referred to herein as a comparator circuit.

In an exemplary embodiment, the comparator 221 may determine whether to apply the zonal attenuation compensation based on the load values L1, L2, . . . , L64 and/or data variation values DV1, DV2, . . . , DV64 provided from the image analyzing unit 210.

For example, the comparator 221 may determine to apply the zonal attenuation compensation when the sum of the load values L1, L2, . . . , L64 and/or data variation values DV1, DV2, . . . , DV64 provided from the image analyzing unit 210 is less than the predetermined threshold value. However, the present invention is not limited thereto. For example, in an exemplary embodiment, the comparator 221 may determine to apply the zonal attenuation compensation when the load value and/or data variation value of the reference block among the load values L1, L2, . . . , L64 and/or data variation values DV1, DV2, . . . , DV64 provided from the image analyzing unit 210 is less than the predetermined threshold value. When determining to apply the zonal attenuation compensation, the comparator 221 may generate the luminance gain control signal GC based on the load values L1, L2, . . . , L64 and/or data variation values DV1, DV2, . . . , DV64 provided from the image analyzing unit 210.

Alternatively, the comparator 221 may determine not to apply the zonal attenuation compensation when the sum of the load values L1, L2, . . . , L64 and/or data variation values DV1, DV2, . . . , DV64 provided from the image analyzing unit 210 is larger than or equal to the predetermined threshold value. However, the present invention is not limited thereto. For example, in an exemplary embodiment, the comparator 221 may determine not to apply the zonal attenuation compensation when the load value and/or data variation value of the reference block among the load values L1, L2, . . . , L64 and/or data variation values DV1, DV2, . . . , DV64 provided from the image analyzing unit 210 is larger than or equal to the predetermined threshold value. In an exemplary embodiment, when determining not to apply the zonal attenuation compensation, the comparator 221 does not generate the luminance gain control signal GC.

When determining to apply the zonal attenuation compensation, the comparator 221 may extract a reference block having the largest load values L1, L2, . . . , L64 and/or data variation values DV1, DV2, . . . , DV64 among the unit blocks Block to Block64.

The comparator 221 may generate the luminance gain control signal GC based on information on the load values L1, L2, . . . , L64 and/or data variation values DV1, DV2, . . . , DV64 and information on the extracted reference block, and may provide the luminance gain control signal GC to the luminance gain controller 222.

The luminance gain controller 222 may generate a luminance gain curve Z_GAIN based on the luminance gain control signal GC provided by the comparator 221 and reference luminance gain values R_GAIN provided by the memory 230 (see FIG. 3). In an exemplary embodiment, the luminance gain controller 222 may be implemented as a circuit. Thus, the luminance gain controller 222 may also be referred to herein as a luminance gain controller circuit.

In an exemplary embodiment, the luminance gain controller 222 may select one of the predetermined reference luminance gain values R_GAIN based on the information on the load values L1, L2, . . . , L64 and/or data variation values DV1, DV2, . . . , DV64, and may generate the luminance gain curve Z_GAIN based on information on a reference block included in the selected reference luminance gain value R_GAIN and the luminance gain control signal GC.

The reference luminance gain values R_GAIN may be predetermined based on the load values L1, L2, . . . , L64 and/or data variation values DV1, DV2, . . . , DV64. For example, the reference luminance gain values R_GAIN may include the predetermined luminance gain values based on the sum of the load values L1, L2, . . . , L64 and/or data variation values DV1, DV2, . . . , DV64 obtained for each unit block. As another example, the reference luminance gain values R_GAIN may include the predetermined luminance gain values based on the load value and/or data variation value of the reference block.

In an exemplary embodiment, when the comparator 221 determines not to apply the zonal attenuation compensation, the luminance gain controller 222 does not receive the luminance gain control signal GC. Accordingly, the luminance gain controller 222 does not generate the luminance gain curve Z_GAIN, and the data compensator 240 (see FIG. 3) may output the input image data IDATA as corrected image data CDATA without correcting the input image data IDATA.

In an exemplary embodiment, the comparator 221 may generate a luminance gain control signal GC that controls a degree to which the luminance gain value of the luminance gain curve Z_GAIN is decreased moving away from the center of the reference block, based on a magnitude of the obtained load values of the input image data IDATA L1, L2, . . . , L64 and/or data variation values of the input image data IDATA DV1, DV2, . . . , DV64. Accordingly, the luminance gain controller 222 may control a degree to which the luminance gain value of the luminance gain curve Z_GAIN is decreased moving away from the center of the reference block based on the luminance gain control signal GC provided by the comparator 221.

For example, the comparator 221 may generate a luminance gain control signal GC for increasing the degree to which the luminance gain value of the luminance gain curve Z_GAIN is decreased moving away from the center of the reference block as the sum of the obtained load values of the input image data IDATA L1, L2, . . . , L64 and/or the sum of the obtained data variation values of the input image data IDATA DV1, DV2, . . . , DV64 decreases. Accordingly, the luminance gain controller 222 may increase the degree to which the luminance gain value of the luminance gain curve Z_GAIN is decreased moving away from the center of the reference block based on the luminance gain control signal GC provided by the comparator 221.

In another example, the comparator 221 may generate a luminance gain control signal GC for increasing the degree to which the luminance gain value of the luminance gain curve Z_GAIN is decreased moving away from the center of the reference block as a load value and/or data variation value corresponding to the reference block among the obtained load values of the input image data IDATA L1, L2, . . . , L64 and/or data variation values of the input image data IDATA DV1, DV2, . . . , DV64 are smaller. Accordingly, the luminance gain controller 222 may increase a degree to which the luminance gain value of the luminance gain curve Z_GAIN is decreased moving away from the center of the reference block based on the luminance gain control signal GC provided by the comparator 221.

FIGS. 5 and 6A to 6E may be referred to describe an operation of the luminance gain controller 222 (or the zonal compensator 200 (see FIG. 3)) generating the luminance gain curve Z_GAIN.

Figure 5:
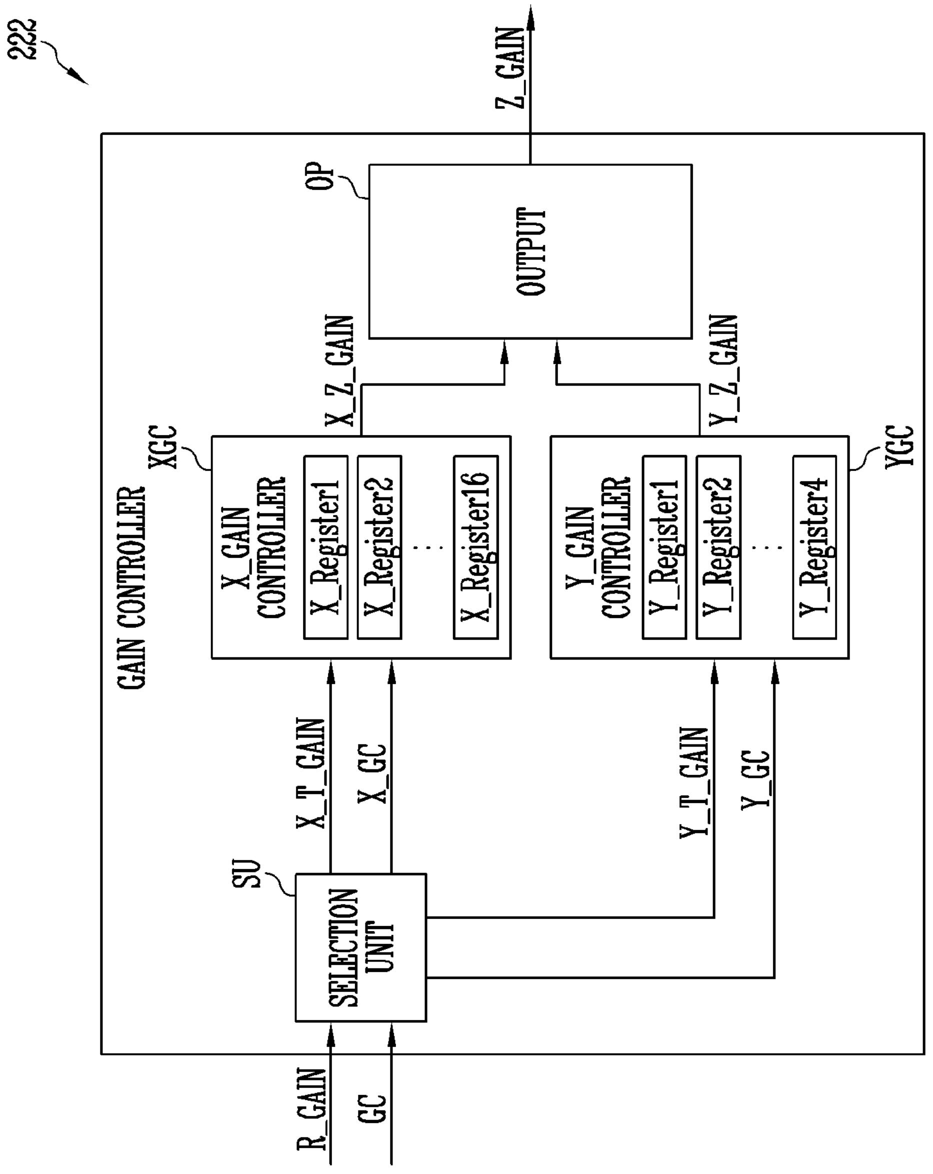
FIG. 5 illustrates a luminance gain controller included in a luminance gain generating unit shown in FIG. 4 according to an exemplary embodiment of the present invention.

FIG. 5 illustrates the luminance gain controller 222 included in the luminance gain generating unit 220 shown in FIG. 4 according to an exemplary embodiment of the present invention. FIGS. 6A to 6E illustrate an example of an operation method of the zonal compensator 300 shown in FIG. 3.

Figure 6A:
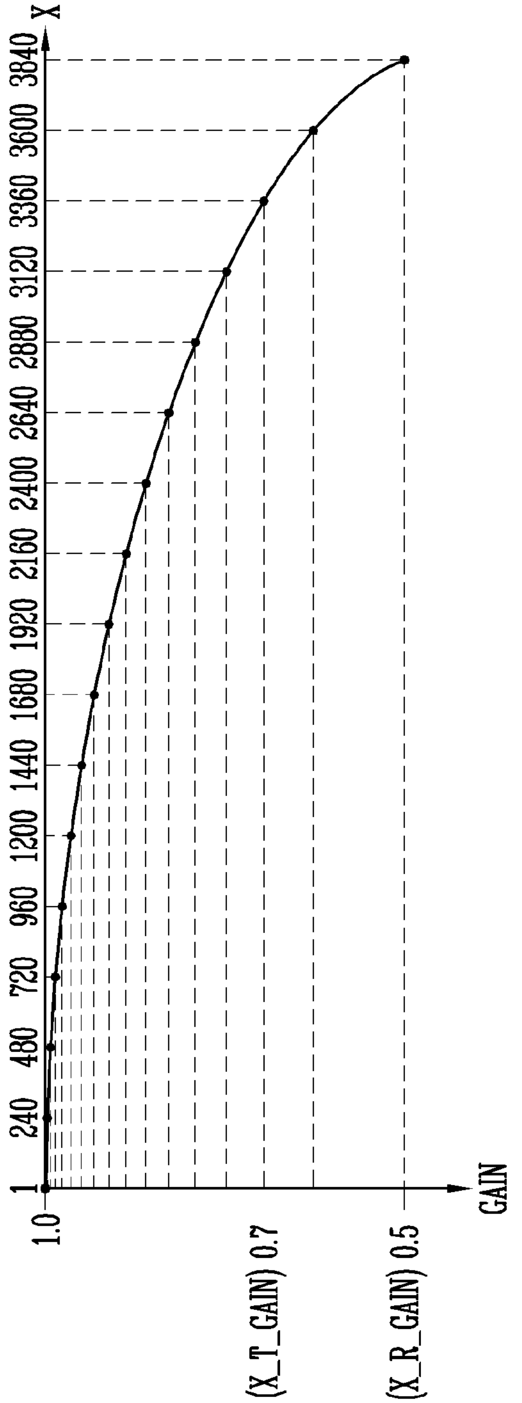
FIGS. 6A to 6E illustrate an example of an operation method of the zonal compensator shown in FIG. 3.
Figure 6B:
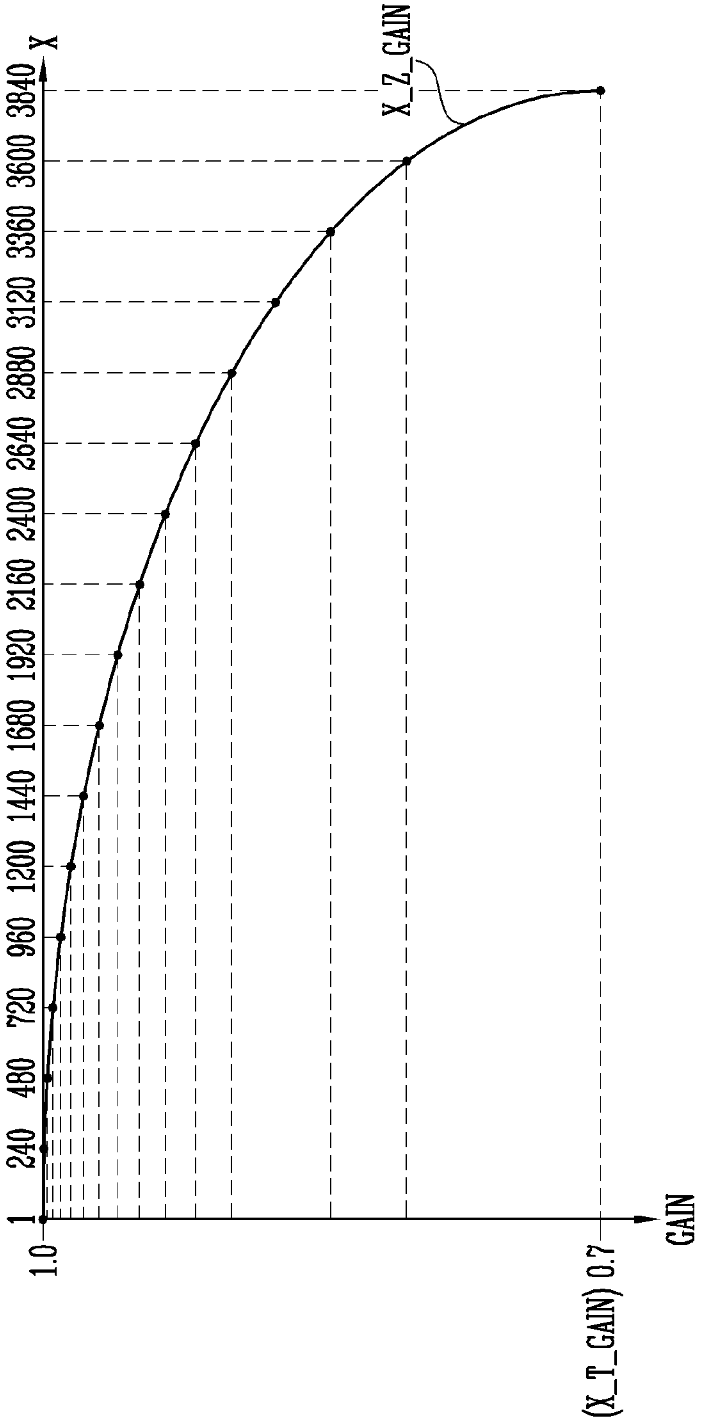
Figure 6C:
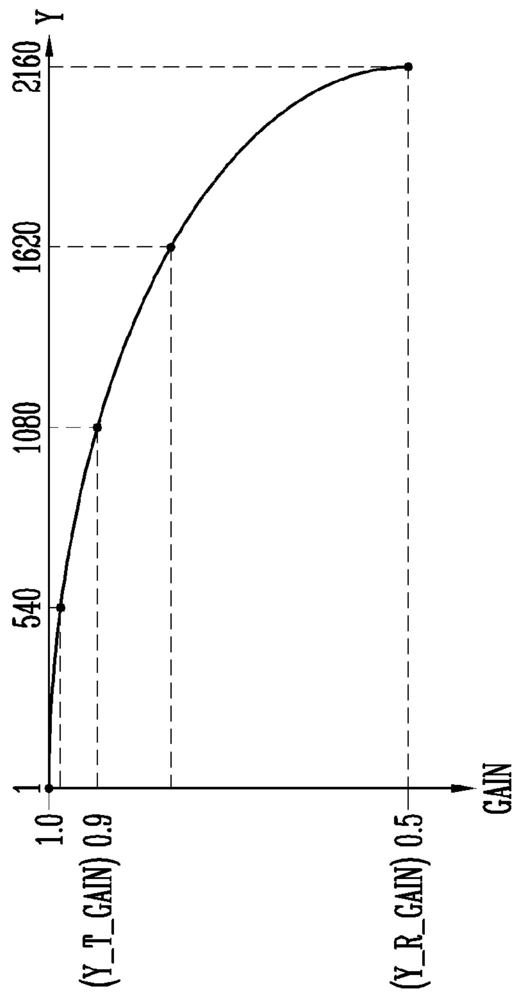
Figure 6D:
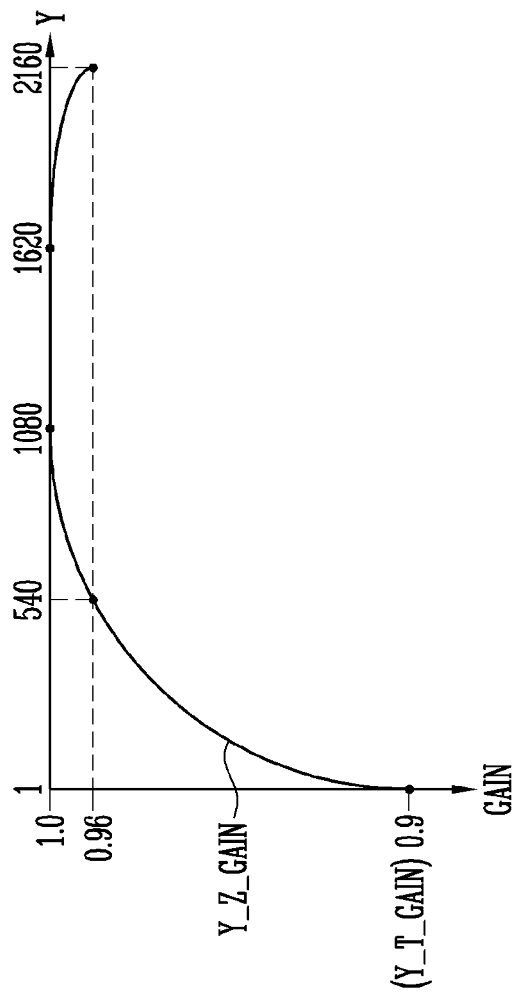
Figure 6E:
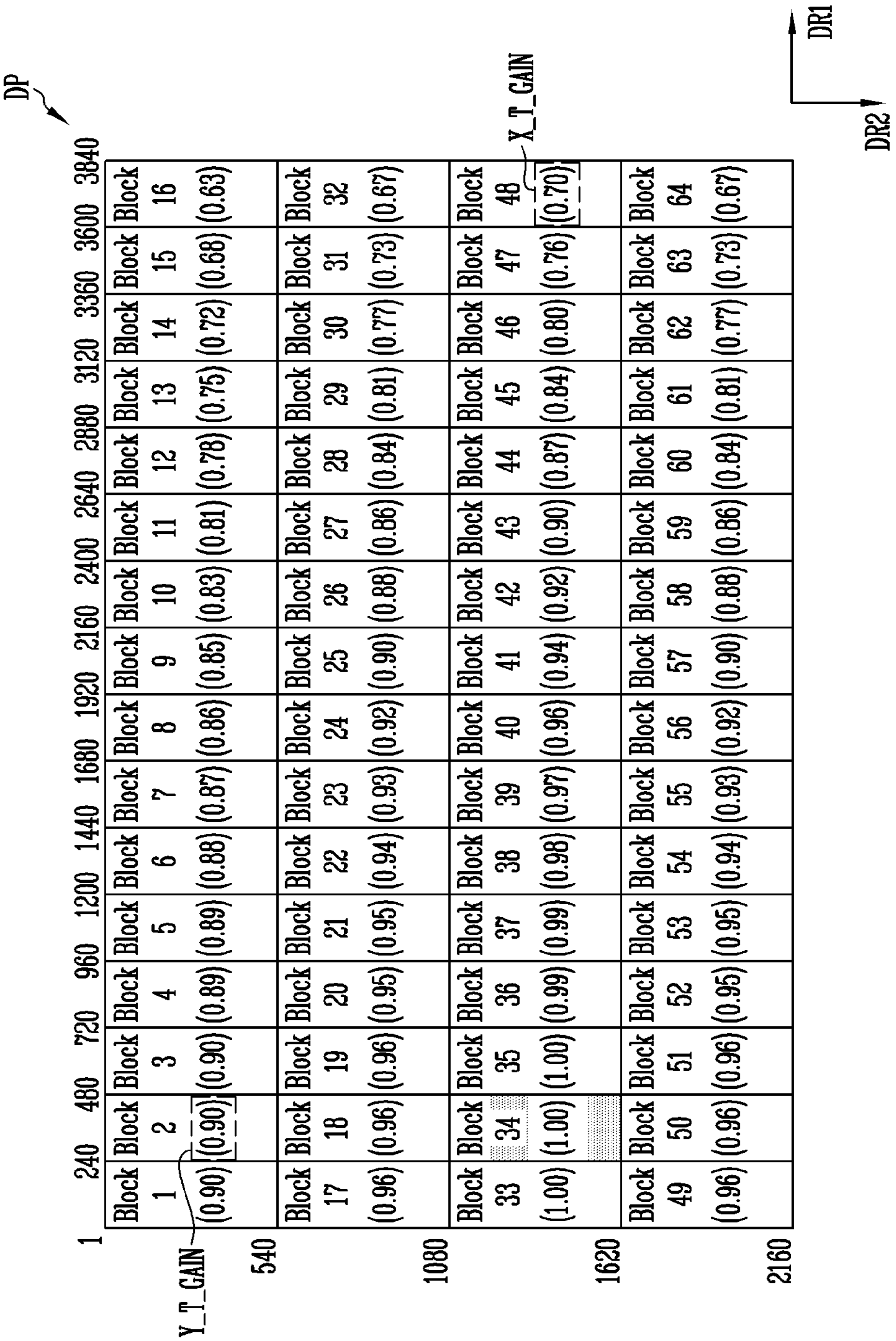

Referring to FIGS. 6A to 6E, FIGS. 6A and 6C may illustrate luminance gain curves corresponding to relative spatial positions of the pixels PX in a first direction DR1 (see FIG. 2) and a second direction DR2 (see FIG. 2) of the display panel DP (see FIG. 2), respectively, FIGS. 6B and 6D may illustrate first and second sub-luminance gain curves X_Z_GAIN and Y_Z_GAIN including luminance gain values corresponding to distances in the first direction DR1 (see FIG. 2) and the second direction DR2 (see FIG. 2), from the center of the reference block, respectively, and FIG. 6E may illustrate luminance gain values corresponding to the unit blocks Block1 to Block64 (or spatial positions of the pixels PX disposed in the unit blocks Block1 to Block64) included in the display panel DP. The display panel DP of FIG. 6E may be substantially the same as the display panel DP described with reference to FIG. 2. In FIG. 6E, the pixels PX disposed in the unit blocks Block1 to Block64 included in the display panel DP are shown to have the same luminance gain value (for example, pixels PX disposed in the first unit block Block1 have the same luminance gain value of 0.9, and pixels PX disposed in the sixty-fourth unit block Block64 have the same luminance gain value of 0.67). However, this is exemplarily illustrated for better understanding and ease of description, and the pixels PX disposed in each unit block may have different luminance gain values corresponding to each spatial position according to exemplary embodiments.

Hereinafter, it is assumed that the comparator 221 extracts the thirty-fourth unit block Block34 as the reference block.

Referring to FIGS. 4, 5 and 6A to 6E, the luminance gain controller 222 may include a selection unit SU, a first sub-luminance gain controller XGC, a second sub-luminance gain controller YGC, and an output unit OP. In exemplary embodiments, each of the selection unit SU, the first sub-luminance gain controller XGC, the second sub-luminance gain controller YGC, and the output unit OP may be implemented as a circuit. Thus, the selection unit SU may also be referred to herein as a selection circuit, the first sub-luminance gain controller XGC may also be referred to as a first sub-luminance gain controller circuit, the second sub-luminance gain controller YGC may also be referred to herein as a second sub-luminance gain controller circuit, and the output unit OP may also be referred to as an output circuit.

The selection unit SU may generate a first target luminance gain value X_T_GAIN, a first sub-luminance gain control signal X_GC, a second target luminance gain value Y_T_GAIN, and a second sub-luminance gain control signal Y_GC based on the predetermined reference luminance gain values R_GAIN and the luminance gain control signal GC.

The reference luminance gain values R_GAIN may include the predetermined reference luminance gain values R_GAIN corresponding to the first direction DR1 and the predetermined reference luminance gain values R_GAIN corresponding to the second direction DR2.

In an exemplary embodiment, the selection unit SU may select the first sub-reference luminance gain value X_R_GAIN (see FIG. 6A) corresponding to the first direction DR1 and a second sub-reference luminance gain value Y_R_GAIN (see FIG. 6C) corresponding to the second direction DR2 among the predetermined reference luminance gain values R_GAIN provided by the memory 230 (see FIG. 3) based on the load values L1, L2, . . . , L64 and/or data variation values DV1, DV2, . . . , DV64, regardless of the position of the extracted reference block.

For example, when the comparator 221 (see FIG. 4) generates the luminance gain control signal GC for increasing the degree to which the luminance gain value of the luminance gain curve Z_GAIN is decreased moving away from the center of the reference block based on the sum of the load values L1, L2, . . . , L64 and/or the sum of the data variation values DV1, DV2, . . . , DV64, the selection unit SU may select the first sub-reference luminance gain value X_R_GAIN (see FIG. 6A) and the second sub-reference luminance gain value Y_R_GAIN (see FIG. 6C) having a relatively small value based on the luminance gain control signal GC provided by the comparator 221 (see FIG. 4).

As another example, when the comparator 221 (see FIG. 4) generates the luminance gain control signal GC for increasing the degree to which the luminance gain value of the luminance gain curve Z_GAIN is decreased moving away from the center of the reference block based on the load value and/or data variation value of the reference block (e.g., the thirty-fourth unit block Block34) among the load values L1, L2, . . . , L64 and/or the data variation values DV1, DV2, . . . , DV64, the selection unit SU may select the first sub-reference luminance gain value X_R_GAIN (see FIG. 6A) and the second sub-reference luminance gain value Y_R_GAIN (see FIG. 6C) having a relatively small value based on the luminance gain control signal GC provided by the comparator 221 (see FIG. 4).

In an exemplary embodiment, the selection unit SU may select the first sub-reference luminance gain value X_R_GAIN corresponding to the maximum length in the first direction DR1 of the display panel DP among the predetermined reference luminance gain values R_GAIN, and may select the second sub-reference luminance gain value Y_R_GAIN corresponding to the maximum length in the second direction DR1 of the display panel DP among the predetermined reference luminance gain values R_GAIN, based on information on the load values L1, L2, . . . , L64 and/or data variation values DV1, DV2, . . . , DV64 included in the luminance gain control signal GC. For example, as shown in FIG. 6A, the selection unit SU may select 0.5 as the first sub-reference luminance gain value X_R_GAIN among the predetermined reference luminance gain values R_GAIN corresponding to the maximum length (e.g., 3840) in the first direction DR1 of the display panel DP among the predetermined reference luminance gain values R_GAIN, and may select 0.5 as the second sub-reference luminance gain value Y_R_GAIN among the predetermined reference luminance gain values R_GAIN corresponding to the maximum length (e.g., 2160) in the second direction DR2 of the display panel DP among the predetermined reference luminance gain values R_GAIN, based on information on the load values L1, L2, . . . , L64 and/or data variation values DV1, DV2, . . . , DV64 included in the luminance gain control signal GC.

The selection unit SU may obtain luminance gain values corresponding to relative spatial positions (e.g., 1, 240, 480, . . . , 3840) of the pixels PX in the first direction DR1 based on the selected first sub-reference luminance gain value X_R_GAIN, and may obtain luminance gain values corresponding to relative spatial positions (e.g., 1, 540, 1080, . . . , 2160) of the pixels PX in the second direction DR2 based on the selected second sub-reference luminance gain value Y_R_GAIN.

In addition, the selection unit SU may generate first and second target luminance gain values X_T_GAIN and Y_T_GAIN based on information on the reference block included in the selected first and second sub-reference luminance gain values X_R_GAIN and Y_R_GAIN and the luminance gain control signal GC. The first and second target luminance gain values X_T_GAIN and Y_T_GAIN may be generated based on relative spatial distances (e.g., the spatial distance corresponding to 3360 minus 3840 to 480 in the first direction DR1, and the spatial distance corresponding to 1080 minus 2160 to 1080 in the second direction DR2) of the pixel PX disposed at the furthest distance in each of the first direction DR1 and the second direction DR2 from the thirty-fourth unit block Block34 corresponding to the reference block, respectively. Accordingly, the selection unit SU may generate the first target luminance gain value X_T_GAIN having a value of 0.7 based on the luminance gain values (e.g., luminance gain values GAIN included in the graph shown in FIG. 6A) corresponding to the relative spatial positions (e.g., 1, 240, 480, . . . , 3840) of the pixels PX in the first direction DR1, respectively. Similarly, the selection unit SU may generate the second target luminance gain value Y_T_GAIN having a value of 0.9 based on the luminance gain values (e.g., luminance gain values GAIN included in the graph shown in FIG. 6C) corresponding to the relative spatial positions (e.g., 1, 540, 1080, . . . , 2160) of the pixels PX in the second direction DR2, respectively.

When the selection unit SU selects first and second sub-reference luminance gain values X_R_GAIN and Y_R_GAIN having relatively small values based on the luminance gain control signal GC generated by the comparator 221 (see FIG. 4), the selection unit SU may generate the first and second target luminance gain values X_T_GAIN and Y_T_GAIN having relatively small values based on the first and second sub-reference luminance gain values X_R_GAIN and Y_R_GAIN.

The selection unit SU may provide a first target luminance gain value X_T_GAIN and a first sub-luminance gain control signal X_GC to a first sub-luminance gain controller XGC, and may provide a second target luminance gain value Y_T_GAIN and a second sub-luminance gain control signal Y_GC to a second sub-luminance gain controller YGC. The first sub-luminance gain control signal X_GC may include information on luminance gain values (e.g., luminance gain values GAIN included in the graph shown in FIG. 6A) corresponding to the relative spatial positions (e.g., 1, 240, 480, . . . , 3840) of the pixels PX in the first direction DR1, and the second sub-luminance gain control signal Y_GC may include information on luminance gain values (e.g., luminance gain values GAIN included in the graph shown in FIG. 6C) corresponding to the relative spatial positions (e.g., 1 1, 540, 1080, . . . , 2160) of the pixels PX in the second direction DR1.

The first sub-luminance gain controller XGC may generate a first sub-luminance gain curve X_Z_GAIN (e.g., the graph shown in FIG. 6B) including luminance gain values corresponding to a distance from the center of the reference block (e.g., the thirty-fourth unit block Block34) in the first direction DR1 based on the first target luminance gain value X_T_GAIN and the first sub-luminance gain control signal X_GC.

In an exemplary embodiment, the first sub-luminance gain controller XGC may include a plurality of first registers X_Register1 to X_Register16, and a plurality of first registers X_Register1 to X_Register16 may include the reference luminance gain curves for the luminance gain values according to relative spatial positions of the reference block in the first direction DR1. As shown in FIG. 6B, the first sub-luminance gain controller XGC may generate the first sub-luminance gain curve X_Z_GAIN including the luminance gain values corresponding to a distance from the center of the reference block (e.g., the thirty-fourth unit block Block34) in the first direction DR1 by applying luminance gain values (e.g., luminance gain values GAIN included in the graph shown in FIG. 6A) included in the first target luminance gain value X_T_GAIN and the first sub-luminance gain control signal X_GC to the reference luminance gain curve stored in the first register corresponding to the reference block among the first registers X_Register1 to X_Register16. At this time, the luminance gain value having a value of 1 may be applied to the reference block (e.g., the thirty-fourth unit block Block34).

A second sub-luminance gain curve Y_Z_GAIN may also be generated similarly to the first sub-luminance gain curve X_Z_GAIN.

The second sub-luminance gain controller YGC may generate a second sub-luminance gain curve Y_Z_GAIN (e.g., the graph shown in FIG. 6D) including luminance gain values corresponding to a distance from the center of the reference block (e.g., the thirty-fourth unit block Block34)

in the second direction DR2 based on the second target luminance gain value Y_T_GAIN and the second sub-luminance gain control signal Y_GC.

In an exemplary embodiment, the second sub-luminance gain controller YGC may include a plurality of second registers Y_Register1 to Y_Register16, and the plurality of second registers Y_Register1 to Y_Register16 may include the reference luminance gain curves for the luminance gain values according to relatively spatial positions of the reference block in the second direction DR1. As shown in FIG. 6D, the second sub-luminance gain controller YGC may generate the second sub-luminance gain curve Y_Z_GAIN including the luminance gain values corresponding to a distance from the center of the reference block (e.g., the thirty-fourth unit block Block34) in the second direction DR2 by applying luminance gain values (e.g., luminance gain values GAIN included in the graph shown in FIG. 6C) included in the second target luminance gain value Y_T_GAIN and the second sub-luminance gain control signal Y_GC to the reference luminance gain curve stored in the second register corresponding to the reference block among the second registers Y_Register1 to Y_Register16. At this time, the luminance gain value having a value of 1 may be applied to the reference block (e.g., thirty-fourth unit block Block34).

The output unit OP may generate the luminance gain curve Z_GAIN by obtaining the first and second sub-luminance gain curves X_Z_GAIN and Y_Z_GAIN provided by the first and second sub-luminance gain controllers XGC and YGC, respectively.

In an exemplary embodiment, the output unit OP may generate the luminance gain curve Z_GAIN by multiplying a value of the first sub-luminance gain curve X_Z_GAIN corresponding to a distance from the center of the reference block to any pixel PX in the first direction DR1 by a value of the second sub-luminance gain curve Y_Z_GAIN corresponding to a distance from the center of the reference block to any pixel PX in the second direction DR2 and by obtaining the luminance gain value applied to an any pixel PX, for any pixel PX disposed on the display panel DP. For example, the output unit OP may obtain the luminance gain value of 0.81 applied to the pixels PX disposed in the eleventh unit block Block11 by multiplying 0.9, which is the luminance gain value corresponding to the forty-third unit block Block43 corresponding to the distance from the reference block (e.g., the thirty-fourth unit block Block34) in the first direction DR1 by 0.9, which is the luminance gain value corresponding to the second unit block Block2 corresponding to the distance from the reference block (e.g., the thirty-fourth unit block Block34) in the second direction DR2, for pixels PX disposed in the eleventh unit block Block11. In FIG. 6E, the pixels PX disposed in the unit blocks Block1 to Block64 included in the display panel DP are shown to have the same luminance gain value (for example, pixels PX disposed in the eleventh unit block Block11 have the same luminance gain value of 0.81). However, this is exemplarily illustrated for better understanding and ease of description, and the pixels PX disposed in each unit block may have different luminance gain values corresponding to each spatial position according to exemplary embodiments.

As described with reference to FIG. 3, the data compensator 240 (see FIG. 3) may generate the corrected image data CDATA by applying the luminance gain curve Z_GAIN generated by the output unit OP (or luminance gain generating unit 220 (see FIG. 3)) to the input image data IDATA.

When the selection unit SU generates first and second target luminance gain values X_T_GAIN and Y_T_GAIN with relatively small values based on the luminance gain control signal GC generated by the comparator 221 (see FIG. 4), a degree of a decrease in the luminance gain value included in the luminance gain curve Z_GAIN generated by the output unit OP may be increased moving away from the center of the reference block. Accordingly, a degree of decrease in luminance of an image displayed on the display panel DP based on the corrected image data CDATA may be increased moving away from the center of the reference block.

In an exemplary embodiment, the luminance gain curve Z_GAIN generated based on the first and second sub-luminance gain curves X_Z_GAIN and Y_Z_GAIN may have a Gaussian distribution in which the luminance gain value is gradually decreased moving away from the center of the reference block. For example, as shown in FIG. 6E, the luminance gain value may become smaller moving away from the center of the reference block (e.g., the thirty-fourth unit block Block34).

In an exemplary embodiment, the luminance gain curve Z_GAIN may be nonlinearly decreased, and as the distance from the center of the reference block (e.g., the thirty-fourth unit block Block34) increases, a decrease rate of the luminance gain curve may be increased. For example, as shown in FIGS. 6B and 6D, the first and second sub-luminance gain curves X_Z_GAIN and Y_Z_GAIN may be nonlinear, and may have a form in which a decrease rate of the curve is increased as the distance from the center of the reference block increases. Accordingly, the luminance gain curve Z_GAIN may be also nonlinear, and may have a form in which the decrease rate of the curve is increased as the distance from the center of the reference block increases. However, a shape of the luminance gain curve Z_GAIN is not limited thereto. For example, in an exemplary embodiment, the luminance gain curve Z_GAIN may decrease linearly.

In an exemplary embodiment, when the distances from the center of the reference block are the same, the luminance gain curve Z_GAIN may have the same luminance gain value. For example, as shown in FIG. 6B, in a case of the first sub-luminance gain curve X_Z_GAIN, the same luminance gain value (e.g., a luminance gain value of 1 as shown in FIG. 6B) may be applied to positions (e.g., positions corresponding to '1' and '720' as shown in FIG. 6B) away from the reference block (e.g., the thirty-fourth unit block Block34) by the same spatial distance (e.g., a spatial distance corresponding to '240' as shown in FIG. 6B). Similarly, as shown in FIG. 6D, in a case of the second sub-luminance gain curve Y_Z_GAIN, the same luminance gain value (e.g., a luminance gain value of 0.96 as shown in FIG. 6D) may be applied to positions (e.g., positions corresponding to '540' and '1620' as shown in FIG. 6D) away from the reference block (e.g., the thirty-fourth unit block Block34) by the same spatial distance (e.g., a spatial distance corresponding to '540' as shown in FIG. 6D).

Accordingly, the luminance gain curve Z_GAIN generated based on the first and second sub-luminance gain curves X_Z_GAIN and Y_Z_GAIN may have the same luminance gain value when the distance from the center of the reference block thereof is the same. For example, eighteenth and fiftieth unit blocks Block18 and Block50 having the same distance from the reference block (e.g., the thirty-fourth unit block Block34) may have the same luminance gain value (e.g., 0.96).

However, the present invention is not limited thereto, and the decrease rate of the luminance gain curve Z_GAIN may have a different value depending on a direction away from the reference block (e.g., the thirty-fourth unit block Block34). A configuration in which the decrease ratio of the luminance gain curve Z_GAIN has a different value depending on the direction away from the reference block may be described with reference to FIGS. 7A to 7E.

FIGS. 7A to 7E illustrate another example of an operation method of the zonal compensator 200 shown in FIG. 3.

Figure 7A:
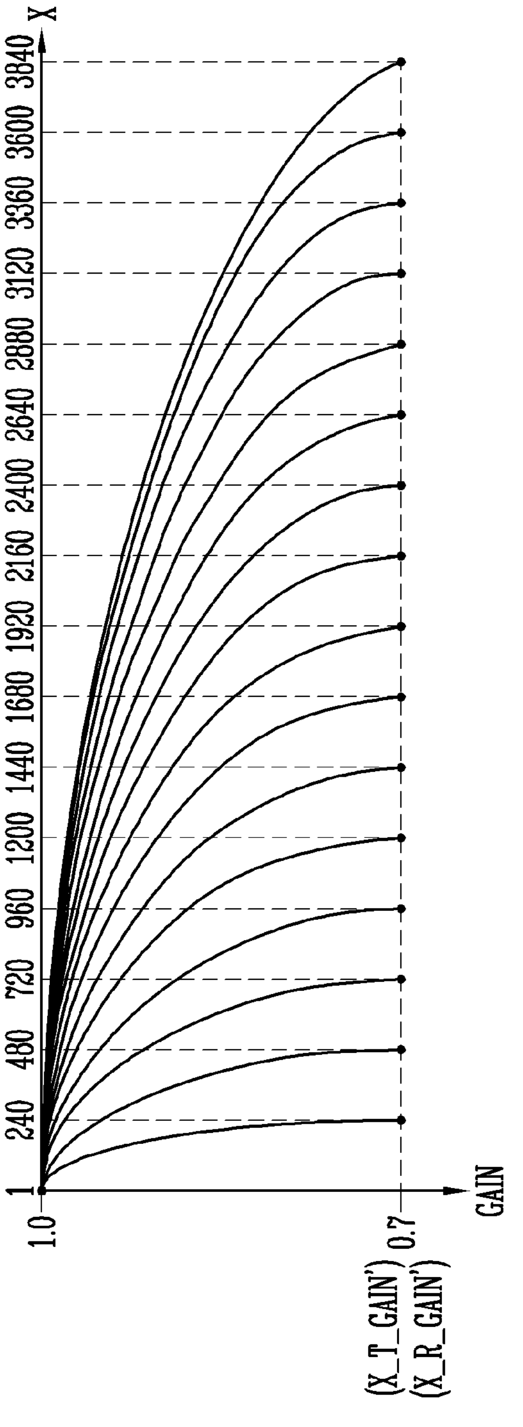
FIGS. 7A to 7E illustrate another example of an operation method of the zonal compensator shown in FIG. 3.
Figure 7B:
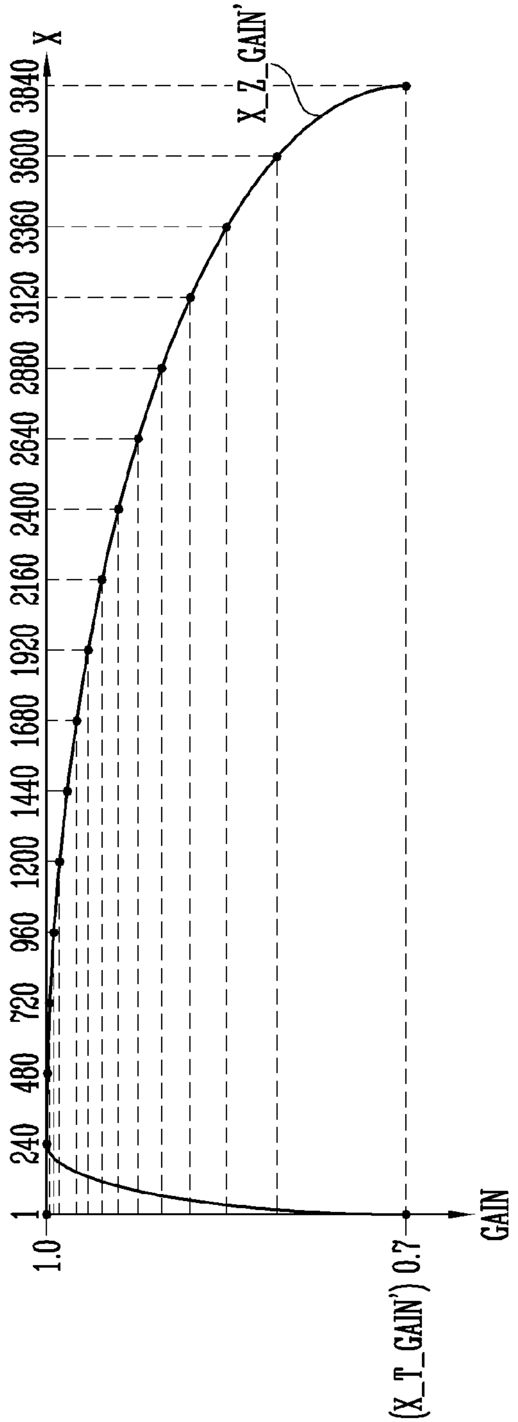
Figure 7C:
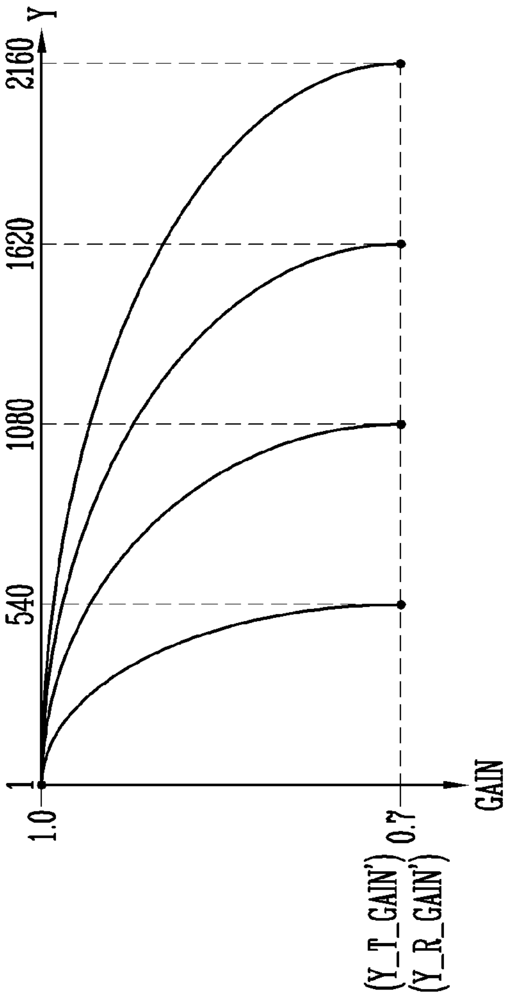
Figure 7D:
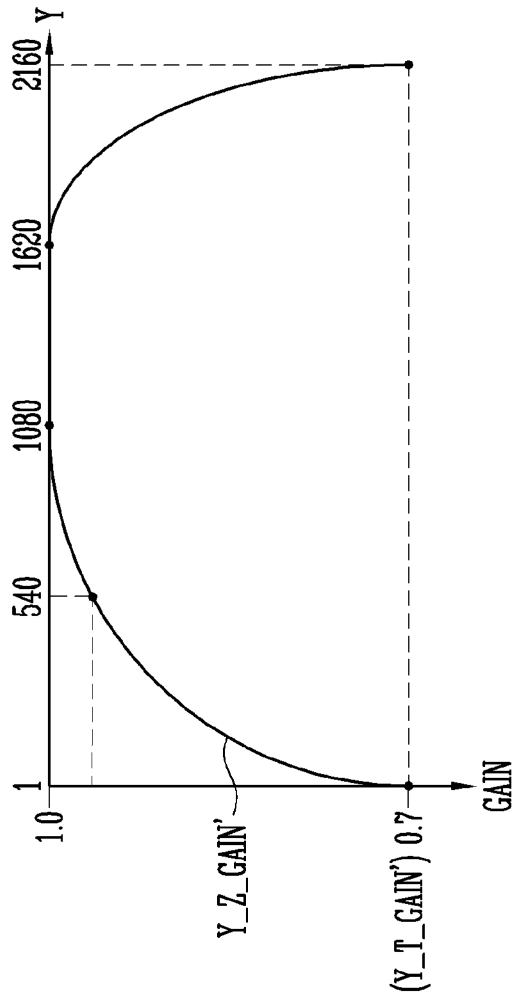
Figure 7E:
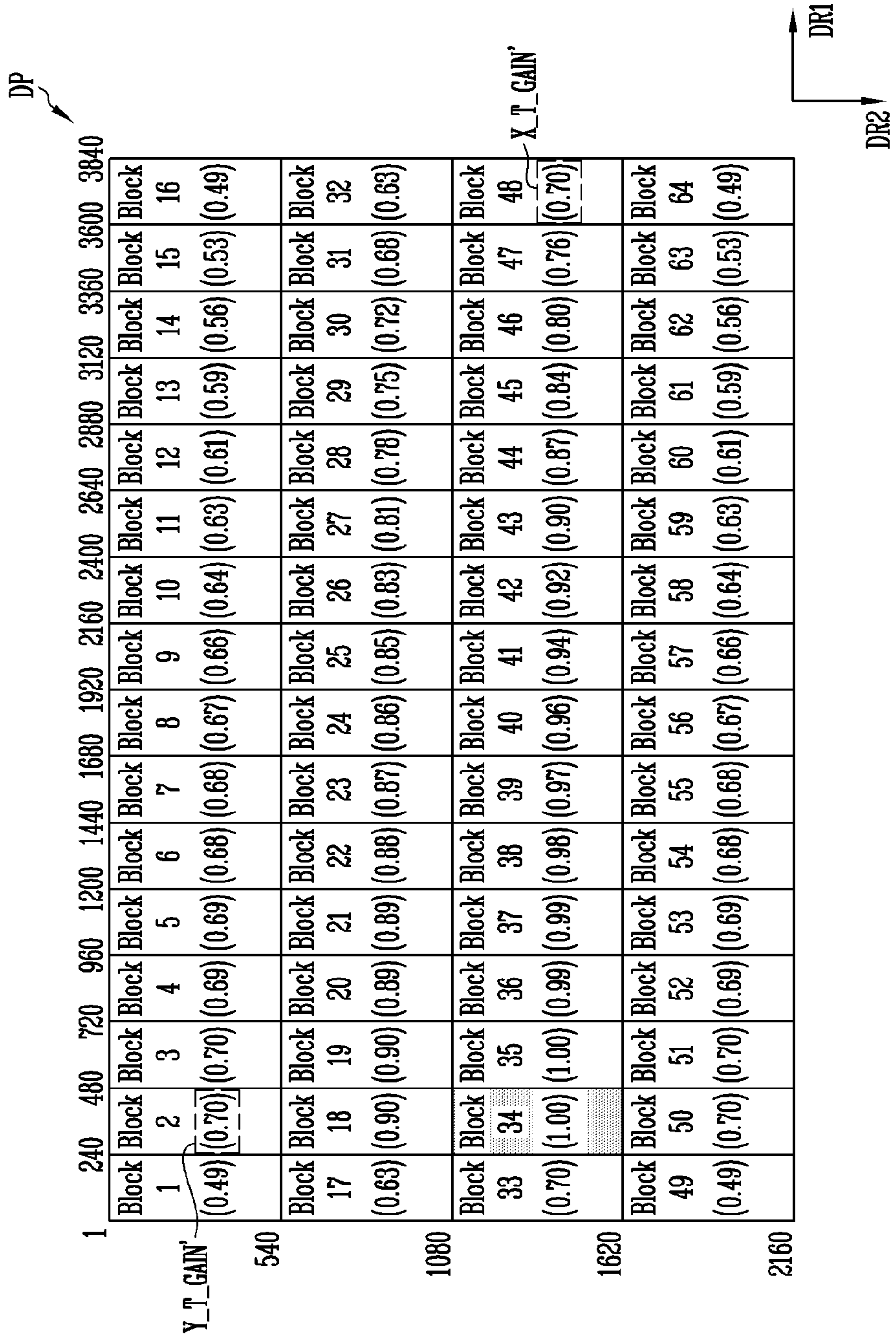

Referring to FIGS. 7A to 7E, FIGS. 7A and 7C may illustrate luminance gain curves corresponding to relative spatial positions of the pixels PX in a first direction DR1 (see FIG. 2) and a second direction DR2 (see FIG. 2) of the display panel DP (see FIG. 2), respectively, FIGS. 7B and 7D may illustrate first and second sub-luminance gain curves X_Z_GAIN' and Y_Z_GAIN' including luminance gain values corresponding to distances in the first direction DR1 (see FIG. 2) and the second direction DR2 (see FIG. 2), from the center of the reference block, respectively, and FIG. 7E may illustrate luminance gain values corresponding to the unit blocks Block1 to Block64 (or spatial positions of the pixels PX disposed in the unit blocks Block1 to Block64) included in the display panel DP.

Referring to FIGS. 6A, 6C, 7A and 7C, since the luminance gain curves shown in FIGS. 7A and 7C are substantially the same as or similar to the luminance gain curves shown in FIGS. 6A and 6C except that the luminance gain curves shown in FIGS. 7A and 7C have the same first and second target luminance gain values X_T_GAIN' and Y_T_GAIN' regardless of relative spatial positions of the pixels PX, redundant explanations will not be repeated.

In addition, referring to FIGS. 6B, 6D, 7B and FIG. 7D, since the first and second sub-luminance gain curves X_Z_GAIN' and Y_Z_GAIN' shown in FIGS. 7B and 7D are substantially the same as or similar to the first and second sub-luminance gain curves X_Z_GAIN and Y_Z_GAIN shown in FIGS. 6B and 6D except that the decrease rates of the first and second sub-luminance gain curves X_Z_GAIN' and Y_Z_GAIN' shown in FIGS. 7B and 7D have different values depending on the direction away from the reference block, redundant explanations will not be repeated.

In addition, referring to FIGS. 6E and 7E, since the display panel DP shown in FIG. 7E is substantially the same as or similar to the display panel DP shown in FIG. 6E except that the luminance gain values applied to the unit blocks Block1 to Block64 included in the display panel DP shown in FIG. 7E are different, redundant explanations will not be repeated.

Referring to FIGS. 4, 5 and 7A to 7E, the selection unit SU may select the first sub-reference luminance gain value X_R_GAIN' regardless of the length from the reference block in the first direction DR1 of the display panel DP among the predetermined reference luminance gain values R_GAIN, and may select the second sub-reference luminance gain value Y_R_GAIN' regardless of the length from the reference block in the second direction DR2 of the display panel DP among the predetermined reference luminance gain values R_GAIN, based on information on the load values L1, L2, . . . , L64 and/or data variation values DV1, DV2, . . . , DV64 included in the luminance gain control signal GC. For example, as shown in FIG. 7A, the selection unit SU may select 0.7 as the first sub-reference luminance gain value X_R_GAIN' among the predetermined reference luminance gain values R_GAIN regardless of the length from the reference block in the first direction DR1 of the display panel DP among the predetermined reference luminance gain values R_GAIN, and may select 0.7 as the second sub-reference luminance gain value Y_R_GAIN' among the predetermined reference luminance gain values R_GAIN regardless of the length from the reference block in the second direction DR2 of the display panel DP among the predetermined reference luminance gain values R_GAIN, based on information on the load values L1, L2, . . . , L64 and/or data variation values DV1, DV2, . . . , DV64 included in the luminance gain control signal GC.

The selection unit SU may obtain luminance gain values corresponding to relative spatial positions (e.g., 1, 240, 480, . . . , 3840) of the pixels PX in the first direction DR1 based on the selected first sub-reference luminance gain value X_R_GAIN', and may obtain luminance gain values corresponding to relative spatial positions (e.g., 1, 540, 1080, . . . , 2160) of the pixels PX in the second direction DR2 based on the selected second sub-reference luminance gain value Y_R_GAIN'. At this time, since the first sub-reference luminance gain value X_R_GAIN' may be set equal regardless of the length from the reference block in the first direction DR1, the decrease rate of the luminance gain values corresponding to the relative spatial positions of the pixels PX with respect to the first direction DR1 may be different depending on the length from the reference block in the first direction DR1. Similarly, since the second sub-reference luminance gain value Y_R_GAIN' may be set equal regardless of the length from the reference block in the second direction DR2, the decrease rate of the luminance gain values corresponding to the relative spatial positions of the pixels PX with respect to the second direction DR2 may be different depending on the length from the reference block in the second direction DR2.

In addition, the selection unit SU may generate first and second target luminance gain values X_T_GAIN' and Y_T_GAIN' having the same value as the selected first and second sub-reference luminance gain values X_R_GAIN' and Y_R_GAIN', respectively. For example, as shown in FIGS. 7A and 7C, the selection unit SU may generate first and second target luminance gain values X_T_GAIN' and Y_T_GAIN' with values equal to the first and second sub-reference luminance gain values X_R_GAIN' and Y_R_GAIN' with values of 0.7, respectively.

The first sub-luminance gain controller XGC may generate a first sub-luminance gain curve X_Z_GAIN' (e.g., the graph shown in FIG. 7B) including luminance gain values corresponding to a distance from the center of the reference block (e.g., the thirty-fourth unit block Block34) in the first direction DR1 based on the first target luminance gain value X_T_GAIN' and the first sub-luminance gain control signal X_GC.

In an exemplary embodiment, as shown in FIG. 7B, the first sub-luminance gain controller XGC may generate the first sub-luminance gain curve X_Z_GAIN' by applying luminance gain values included in the first target luminance gain value X_T_GAIN' and the first sub-luminance gain control signal X_GC to the reference luminance gain curve stored in the first register corresponding to the reference block among the first registers X_Register1 to X_Register16. In this case, the first sub-luminance gain controller XGC may set the luminance gain value to the first target luminance gain value X_T_GAIN' corresponding to the spatial position of the pixels PX (e.g., the first pixel PX of the pixels PX disposed in the first direction DR1 included in the display panel DP and the 3840-th pixel PX of the pixels PX disposed in the first direction DR1) disposed at both ends of the display panel DP with respect to the first direction DR1 and the opposite direction of the first direction DR1 from the center of the reference block. Accordingly, the first sub-luminance gain curve X_Z_GAIN' may have a different decrease rate depending on the direction away from the reference block (e.g., the thirty-fourth unit block Block34) in the first direction DR1 and the direction away in the opposite direction of the first direction DR1. For example, as shown in FIG. 7B, in the first sub-luminance gain curve X_Z_GAIN', the decrease rate corresponding to the direction away from the reference block (e.g., the thirty-fourth unit block Block34) in the first direction DR1 may be smaller than the decrease rate corresponding to the direction away in the opposite direction of the first direction DR1.

The second sub-luminance gain curve Y_Z_GAIN' may also be generated similarly to the first sub-luminance gain curve X_Z_GAIN'.

The second sub-luminance gain controller YGC may generate a second sub-luminance gain curve Y_Z_GAIN' (e.g., the graph shown in FIG. 7D) including luminance gain values corresponding to a distance from the center of the reference block (e.g., the thirty-fourth unit block Block34) in the second direction DR2 based on the second target luminance gain value Y_T_GAIN' and the second sub-luminance gain control signal Y_GC.

In an exemplary embodiment, as shown in FIG. 7D, the second sub-luminance gain controller YGC may generate the second sub-luminance gain curve Y_Z_GAIN' by applying luminance gain values included in the second target luminance gain value Y_T_GAIN' and the second sub-luminance gain control signal Y_GC to the reference luminance gain curve stored in the second register corresponding to the reference block among the second registers Y_Register1 to Y_Register4. In this case, the second sub-luminance gain controller YGC may set the luminance gain value to the second target luminance gain value Y_T_GAIN' corresponding to the spatial position of the pixels PX (e.g., the first pixel PX of the pixels PX disposed in the second direction DR2 included in the display panel DP and the 2160-th pixel PX of the pixels PX disposed in the second direction DR2) disposed at both ends of the display panel DP with respect to the second direction DR2 and the opposite direction of the second direction DR2 from the center of the reference block. Accordingly, the second sub-luminance gain curve Y_Z_GAIN' may have a different decrease rate depending on the direction away from the reference block (e.g., the thirty-fourth unit block Block34) in the second direction DR2 and the direction away in the opposite direction of the second direction DR2. For example, as shown in FIG. 7D, in the second sub-luminance gain curve Y_Z_GAIN', the decrease rate corresponding to the direction away from the reference block (e.g., the thirty-fourth unit block Block34) in the second direction DR2 may be larger than the decrease rate corresponding to the direction away in the opposite direction of the second direction DR2.

The output unit OP may generate the luminance gain curve Z_GAIN by obtaining the first and second sub-luminance gain curves X_Z_GAIN' and Y_Z_GAIN' provided by the first and second sub-luminance gain controllers XGC and YGC, respectively.

In an exemplary embodiment, the decrease rate of the luminance gain curve Z_GAIN may be different depending on the direction away from the center of the reference block. For example, as shown in FIG. 7B, in the first sub-luminance gain curve X_Z_GAIN', the decrease rate corresponding to the direction away from the reference block (e.g., the thirty-fourth unit block Block34) in the first direction DR1 may be smaller than the decrease rate corresponding to the direction away in the opposite direction of the first direction DR1. However, the first sub-luminance gain curve X_Z_GAIN' may have a value of 0.7 with the same luminance gain value (e.g., first target luminance gain value X_T_GAIN') corresponding to the spatial position of the pixels PX (e.g., the first pixel PX of the pixels PX disposed in the first direction DR1 included in the display panel DP and the 3840-th pixel PX of the pixels PX disposed in the first direction DR1) disposed at both ends of the display panel DP with respect to the first direction DR1 and the opposite direction of the first direction DR1 from the center of the reference block.

Similarly, as shown in FIG. 7D, in the second sub-luminance gain curve Y_Z_GAIN', the decrease rate corresponding to the direction away from the reference block (e.g., the thirty-fourth unit block Block34) in the second direction DR2 may be larger than the decrease rate corresponding to the direction away in the opposite direction of the second direction DR2. However, the second sub-luminance gain curve Y_Z_GAIN' may have a value of 0.7 with the same luminance gain value (e.g., the second target luminance gain value Y_T_GAIN') corresponding to the spatial position of the pixels PX (e.g., the first pixel PX of the pixels PX disposed in the second direction DR2 included in the display panel DP and the 2160-th pixel PX of the pixels PX disposed in the second direction DR2) disposed at both ends of the display panel DP with respect to the second direction DR2 and the opposite direction of the second direction DR2 from the center of the reference block.

Accordingly, the luminance gain curve Z_GAIN generated based on the first and second sub-luminance gain curves X_Z_GAIN' and Y_Z_GAIN' may have different decrease rates depending on the direction away from the center of the reference block. For example, the nineteenth and forty-ninth unit blocks Block19 and Block49, with the same distance from the reference block (e.g., the thirty-fourth unit block Block34) but in opposite directions away from the reference block, may have different luminance gain values (e.g., a luminance gain value of 0.9 corresponding to the nineteenth unit block Block19 and a luminance gain value of 0.49 corresponding to the forty-ninth unit block Block49).

As described above with reference to FIGS. 3 to 7E, the zonal compensator 200 may extract the reference block having the largest load value and/or data variation value among the unit blocks Block1 to Block64, and may perform zonal attenuation compensation for correcting the input image data IDATA so that the luminance of the image displayed on the display panel DP may be decreased moving away from the center of the reference block. Accordingly, at the same time the zonal attenuation compensation is performed to reduce power consumption, luminance corresponding to the area on which the user's eyes are focused is not decreased, and thus deterioration of visibility may be prevented.

Figure 8:
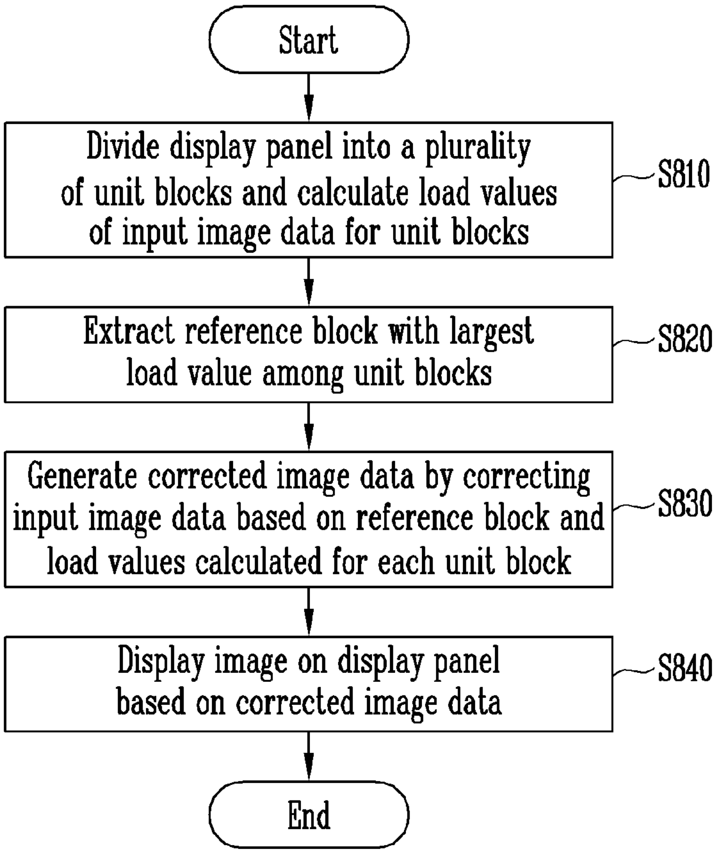
FIG. 8 is a flowchart showing a driving method of a display device according to an exemplary embodiment of the present invention.

FIG. 8 is a flowchart showing a driving method of a display device according to an exemplary embodiment of the present invention.

Referring to FIGS. 1 and 8, a driving method of the display device of FIG. 8 may be performed by the display device 1000 of FIG. 1.

The driving method of FIG. 8 may drive the display device 1000 including the display panel DP including the plurality of pixels PX, the display panel driver 100, and the zonal compensator 200. The display device 1000 may be substantially the same as the display device 1000 of FIG. 1.

First, the driving method of FIG. 8 may divide a display panel (e.g., the display panel DP of FIG. 2) into a plurality of unit blocks (e.g., the plurality of unit blocks Block 1 to Block 64 of FIG. 2), and may obtain load values of input image data for the unit blocks (e.g., a load value for each unit block may be obtained) (S810). A configuration of obtaining the load values of the input image data for the unit blocks may be substantially the same as the configuration in which the image analyzing unit 210 (or the load calculator 211 included in the image analyzing unit 210) included in the zonal compensator 200 described with reference to FIGS. 1 to 4 obtains the load values L of the input image data IDATA based on the input image data IDATA provided from an external source.

Next, the driving method of FIG. 8 may extract a reference block having the largest load value among the unit blocks (e.g., unit blocks Block1 to Block64 of FIG. 2) (S820). A configuration of extracting the reference block may be substantially the same as the configuration in which the luminance gain generating unit 220 (or the comparator 221 included in the luminance gain generating unit 220) included in the zonal compensator 200 described with reference to FIGS. 1 to 4 extracts the reference block based on the load values L provided by the image analyzing unit 210.

Next, the driving method of FIG. 8 may generate corrected image data by correcting the input image data based on the reference block and load values obtained for each unit block (S830). A configuration of generating the corrected image data may be substantially the same as the configuration in which the luminance gain generating unit 220 (or the luminance gain controller 222 included in the luminance gain generating unit 220) included in the zonal compensator 200 described with reference to FIGS. 1 to 5 generates the luminance gain curve Z_GAIN based on the load values L provided by the image analyzing unit 210 and the predetermined reference luminance gain values R_GAIN provided by the memory 230, and the data compensator 240 may generate the corrected image data CDATA by applying the luminance gain curve Z_GAIN provided by the luminance gain generating unit 220 to the input image data IDATA to correct the input image data IDATA.

In an exemplary embodiment, the driving method of FIG. 8 may generate the corrected image data by generating the luminance gain curve based on the reference block and the load values obtained for each unit block and by applying the luminance gain curve to the input image data, and the luminance gain curve may include luminance gain values corresponding to the distance from the center of the reference block.

Next, the driving method of FIG. 8 may display the image on the display panel (e.g., the display panel DP of FIG. 1) based on the corrected image data (S840). In an exemplary embodiment, when the grayscale values included in the input image data IDATA are the same, the luminance of the image displayed on the display panel (e.g., the display panel DP of FIG. 1) based on the corrected image data may decrease moving away from the center of the reference block. A configuration of displaying an image on the display panel may be substantially the same as the configuration in which the display panel DP, described with reference to FIG. 1, displays an image based on the corrected image data CDATA (or the data signal DATA generated based on the corrected image data CDATA).

Figure 9:
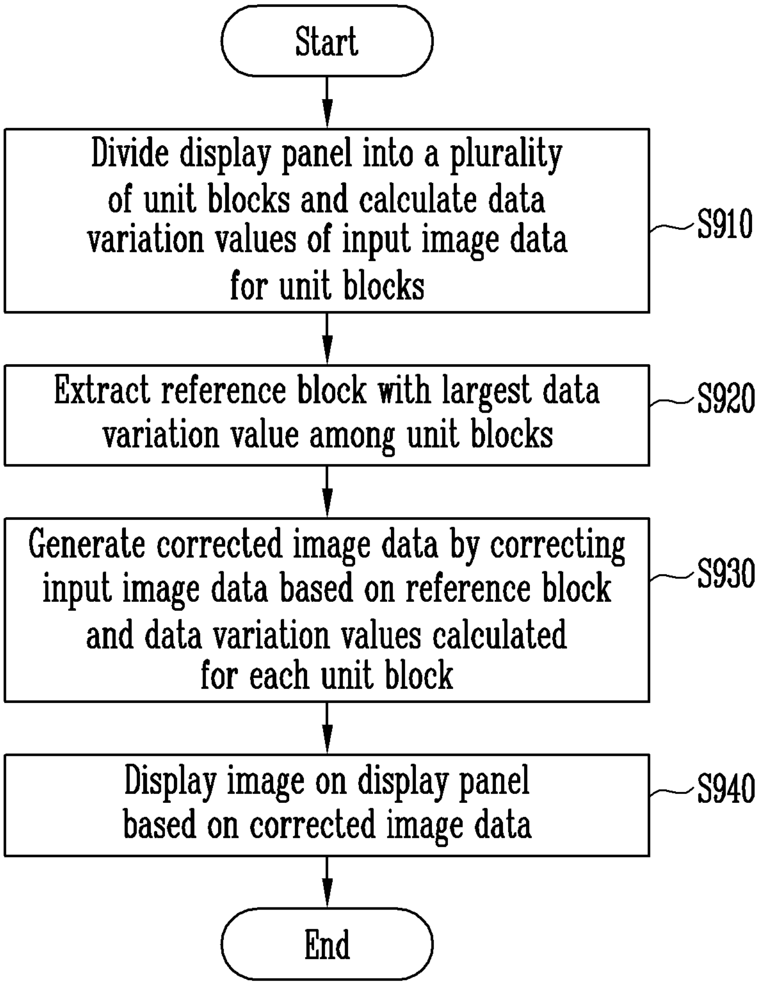
FIG. 9 is a flowchart showing a driving method of a display device according to an exemplary embodiment of the present invention.

FIG. 9 is a flowchart showing a driving method of a display device according to an exemplary embodiment of the present invention.

Referring to FIGS. 1 and 9, a driving method of the display device of FIG. 9 may be performed by the display device 1000 of FIG. 1.

The driving method of FIG. 9 may drive the display device 1000 including the display panel DP including the plurality of pixels PX, the display panel driver 100, and the zonal compensator 200. The display device 1000 may be substantially the same as the display device 1000 of FIG. 1.

First, the driving method of FIG. 9 may divide a display panel (e.g., the display panel DP of FIG. 2) into a plurality of unit blocks (e.g., the plurality of unit blocks Block 1 to Block 64 of FIG. 2), and may obtain data variation values of input image data for the unit blocks (e.g., a data variation value for each unit block may be obtained) (S910). A configuration of obtaining the data variation values of the input image data for each unit block may be substantially the same as the configuration in which the image analyzing unit 210 (or the data variation calculator 212 included in the image analyzing unit 210) included in the zonal compensator 200 described with reference to FIGS. 1 to 4 obtains the data variation values DV of the input image data IDATA based on the input image data IDATA provided from an external source.

In an exemplary embodiment, the driving method of FIG. 9 may obtain the load values of the input image data corresponding to the previous frame for each unit block, may obtain the load values of the input image data corresponding to the current frame for each unit block, and may obtain the data variation values of the input image data by comparing the load values of the input image data corresponding to the previous frame and the load values of the input image data corresponding to the current frame for each unit block.

Next, the driving method of FIG. 9 may extract a reference block having the largest data variation value among the unit blocks (e.g., unit blocks Block1 to Block64 of FIG. 2) (S920). A configuration of extracting the reference block may be substantially the same as the configuration in which the luminance gain generating unit 220 (or the comparator 221 included in the luminance gain generating unit 220) included in the zonal compensator 200 described with reference to FIGS. 1 to 4 extracts the reference block based on the data variation values DV provided by the image analyzing unit 210.

Next, the driving method of FIG. 9 may generate corrected image data by correcting the input image data based on the reference block and data variation values obtained for each unit block (S930). A configuration of generating the corrected image data may be substantially the same as the configuration in which the luminance gain generating unit 220 (or the luminance gain controller 222 included in the luminance gain generating unit 220) included in the zonal compensator 200 described with reference to FIGS. 1 to 5 generates the luminance gain curve Z_GAIN based on the data variation values DV provided by the image analyzing unit 210 and the predetermined reference luminance gain values R_GAIN provided by the memory 230, and the data compensator 240 may generate the corrected image data CDATA by applying the luminance gain curve Z_GAIN provided by the luminance gain generating unit 220 to the input image data IDATA to correct the input image data IDATA.

Next, the driving method of FIG. 9 may display the image on the display panel (e.g., the display panel DP of FIG. 1) based on the corrected image data (S940). In an exemplary embodiment, when the grayscale values included in the input image data IDATA are the same, the luminance of the image displayed on the display panel (e.g., the display panel DP of FIG. 1) based on the corrected image data may decrease moving away from the center of the reference block. A configuration of displaying an image on the display panel may be substantially the same as the configuration in which the display panel DP, described with reference to FIG. 1, displays an image based on the corrected image data CDATA (or the data signal DATA generated based on the corrected image data CDATA).

As is traditional in the field of the present invention, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary embodiments may be physically separated into two or more interacting and discrete blocks, units and/or modules without departing from the scope of the invention. Further, the blocks, units and/or modules of the exemplary embodiments may be physically combined into more complex blocks, units and/or modules without departing from the scope of the inventive concept.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:

a display panel including a plurality of unit blocks disposed in a display area;

a display panel driver configured to generate a data signal based on input image data; and a zone compensator configured to calculate load values of the input image data for the unit blocks, respectively, to extract a reference block with a largest load value among the unit blocks, and to control luminance of the unit blocks based on the reference block and the load values, wherein the zone compensator generates corrected image data by correcting the input image data based on the reference block and the load values, and the display panel driver generates the data signal based on the corrected image data, wherein the zone compensator generates the corrected image data by applying a gain curve to the input image data, the gain curve includes gain values corresponding to spatial locations in the display area, and as a gain value of the gain curve decreases, luminance of the corresponding spatial location in the display area decreases, and wherein the gain curve is generated based on a first sub-luminance gain curve corresponding to a distance from a center of the reference block in a first direction and a second sub-luminance gain curve corresponding to the distance from the center of the reference block in a second direction crossing the first direction.

2. The display device according to claim 1, wherein the zone compensator controls the reference block to have a highest luminance among the unit blocks.

3. The display device according to claim 2, wherein the zone compensator controls the luminance of the unit blocks to gradually decrease as the distance from the center of the reference block increases.

4. The display device according to claim 1, wherein the zone compensator decreases the gain values of the gain curve as the distance from the center of the reference block increases.

5. The display device according to claim 4, wherein, as a load value of the reference block decreases, the zone compensator increases a degree of a decrease in the gain values of the gain curve moving away from the center of the reference block.

6. The display device according to claim 4, wherein, as a sum of the load values of the unit blocks decreases, the zone compensator increases a degree of a decrease in the gain values of the gain curve moving away from the center of the reference block.

7. The display device according to claim 4, wherein, when the distance from the center of the reference block is the same, the gain values of the gain curve are the same.

8. The display device according to claim 4, wherein the gain curve is nonlinearly decreased, and a decrease rate of the gain curve is increased as the distance from the center of the reference block increases.

9. The display device according to claim 4, wherein the gain curve is linearly decreased.

10. The display device according to claim 1, wherein the zone compensator comprises:

an image analyzer configured to calculate the load values of the input image data for the unit blocks;

a gain generator configured to generate the gain curve based on the load values of the unit blocks; and a data compensator configured to generate the corrected image data by applying the gain curve to the input image data.

11. The display device according to claim 10, wherein the image analyzer calculates the load values based on grayscale values of the input image data.

12. The display device according to claim 10, wherein the image analyzer calculates the load values based on on-pixel ratios.

13. A display device, comprising:

a display panel including a plurality of unit blocks disposed in a display area;

a display panel driver configured to generate a data signal based on input image data; and a zone compensator configured to calculate data variation values of the input image data for the unit blocks, respectively, to extract a reference block with a largest data variation value among the unit blocks, and to control luminance of the unit blocks based on the reference block and the data variation values, wherein the zone compensator generates corrected image data by correcting the input image data based on the reference block and the data variation values, and the display panel driver generates the data signal based on the corrected image data, wherein the zone compensator generates the corrected image data by applying a gain curve to the input image data, the gain curve includes gain values corresponding to spatial locations in the display area, and as a gain value of the gain curve decreases, luminance of the corresponding spatial location in the display area decreases, and wherein the gain curve is generated based on a first sub-luminance gain curve corresponding to a distance from a center of the reference block in a first direction and a second sub-luminance gain curve corresponding to the distance from the center of the reference block in a second direction crossing the first direction.

14. The display device according to claim 13, wherein the zone compensator calculates the data variation values of the input image data by comparing load values of the input image data corresponding to a current frame with load values of the input image data corresponding to a previous frame for each unit block.

* * * * *